US012717844B2

(12) United States Patent
Waugh et al.

(10) Patent No.: US 12,717,844 B2
(45) Date of Patent: Aug. 25, 2026

(54) SYSTEMS, METHODS, COMPUTING PLATFORMS, AND STORAGE MEDIA FOR COMPARING DATA SETS THROUGH DECOMPOSING DATA INTO A DIRECTED ACYCLIC GRAPH

(71) Applicant: Unsupervised, Inc., Boulder, CO (US)

(72) Inventors: Justin A. Waugh, Boulder, CO (US); Noah Horton, Boulder, CO (US); Tyler H. Willis, Sanford, NC (US); Bryce Chriestenson, Denver, CO (US)

(73) Assignee: Unsupervised, Inc., Boulder, CO (US)

( * ) Notice: Subject to any disclaimer, the term of this patent is extended or adjusted under 35 U.S.C. 154(b) by 0 days.

(21) Appl. No.: 18/428,199

(22) Filed: Jan. 31, 2024

(65) Prior Publication Data

US 2025/0021603 A1 Jan. 16, 2025

Related U.S. Application Data

(63) Continuation of application No. 16/986,956, filed on Aug. 6, 2020, now Pat. No. 11,899,720.

(60) Provisional application No. 62/883,405, filed on Aug. 6, 2019, provisional application No. 62/883,403, filed on Aug. 6, 2019.

(51) Int. Cl.

| | |
|---|---|
| ***G06F 16/901*** | (2019.01) |
| ***G06F 7/08*** | (2006.01) |
| ***G06F 16/28*** | (2019.01) |
| ***G06F 16/904*** | (2019.01) |
| ***G06N 5/04*** | (2023.01) |
| ***G06N 20/00*** | (2019.01) |

(52) U.S. Cl.
CPC ............ *G06F 16/9024* (2019.01); *G06F 7/08* (2013.01); *G06F 16/287* (2019.01); *G06F 16/904* (2019.01); *G06N 5/04* (2013.01); *G06N 20/00* (2019.01)

(58) Field of Classification Search
None
See application file for complete search history.

(56) References Cited

U.S. PATENT DOCUMENTS

2009/0281845 A1* 11/2009 Fukuda ............ G06Q 10/06393 705/7.39
2010/0077077 A1* 3/2010 Devitt .................. H04L 41/147 709/224
2015/0106324 A1* 4/2015 Puri ........................ G06N 5/04 706/52

(Continued)

*Primary Examiner* — Giuseppi Giuliani
(74) *Attorney, Agent, or Firm* — NOD Law PC

(57) ABSTRACT

Systems, methods, computing platforms, and storage media for decomposing data are disclosed. Exemplary implementations may receive an input data set, identify a first set of criteria for analyzing the input data set, identify a first and a second data subset, wherein the first and second data subset are defined by a first and a second set of filters, respectively, identify a first set of parent sets, each parent set being a subset of the input data set and a superset of the second data subset, and each parent set being defined by a subset of the second set of filters that define the second data subset, generate a directed acyclic graph based at least in part on identifying the first set of parent sets, the first data subset, and/or the second data subset, and display, via a user interface, the directed acyclic graph to a user.

15 Claims, 23 Drawing Sheets

(56) References Cited

U.S. PATENT DOCUMENTS

| | | | | |
|---|---|---|---|---|
| 2015/0278395 | A1* | 10/2015 | Ben Jemaa | G06F 16/9024 707/756 |
| 2020/0167787 | A1* | 5/2020 | Kursun | H04L 67/306 |
| 2020/0380417 | A1* | 12/2020 | Briancon | G06Q 30/012 |
| 2022/0066906 | A1* | 3/2022 | Kumar | G06F 11/328 |

* cited by examiner

SYSTEMS, METHODS, COMPUTING PLATFORMS, AND STORAGE MEDIA FOR COMPARING DATA SETS THROUGH DECOMPOSING DATA INTO A DIRECTED ACYCLIC GRAPH

CROSS-REFERENCE TO RELATED APPLICATIONS

The present application for patent is a continuation of U.S. patent application Ser. No. 16/986,956 entitled "SYSTEMS, METHODS, COMPUTING PLATFORMS, AND STORAGE MEDIA FOR COMPARING DATA SETS THROUGH DECOMPOSING DATA INTO A DIRECTED ACYCLIC GRAPH" filed Aug. 6, 2020 which claims priority to U.S. Provisional Application Ser. No. 62/883,405 entitled "Systems, Methods, Computing Platforms, And Storage Media For Comparing Data Sets Through Decomposing Data Into A Directed Acyclic Graph" and U.S. Provisional Application Ser. No. 62/883,403 entitled "Systems, Methods, Computing Platforms, And Storage Media For Comparing Non-Adjacent Data Subsets", both filed Aug. 6, 2019 and assigned to the assignee hereof and hereby expressly incorporated by reference herein.

FIELD OF THE DISCLOSURE

The present disclosure relates to data analytics systems and more particularly to systems, methods, computing platforms, and storage media for comparing data sets through decomposing data into a directed acyclic graph.

BACKGROUND

Current techniques for analyzing data subsets are lacking. Analyzations of data subsets, especially non-adjacent data subsets, are restricted to decision trees, where a hierarchy of splits in data may be shown on a screen. While current techniques allow for display of non-adjacent subsets, the splits in the data are all inter-related and shown only in a highly hierarchical way. Thus, there is a need for a refined system and process for not only analyzing, but also visualizing data subsets that are not inter-related, and in non-hierarchical ways.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

A directed acyclic graph (DAG) is the more general concept in graph theory that encompasses trees. It is a structure wherein a given node can have multiple parents instead of only one (as in a tree). For example, while we talk about family trees often, they are an unusual form of analysis where you take a single individual (or a couple) and trace their progeny through time. An actual analysis of relationships in a family is an example of a DAG—where each person has 2 biological parents, meaning that there is no 'root' of the tree. Instead, tracing up from a current individual, you will find $2^1$ parents, $2^2$ grandparents, $2^3$ great grandparents, etc. Tracing down from those grandparents, you will then have a huge number of descendants.

Broadly, the present disclosure relates to decomposing data into a DAG, which begins with an input data set (e.g., data universe comprising all the data). Next, an interesting subset (e.g., a subset comprising notable characteristics) is identified. In one example, the interesting subset may relate to a data subset pertaining to women. Further, another interesting subset, such as a data subset pertaining to Ford owners, may be identified. In some embodiments, one or more children subsets of the previously identified data subsets may also be identified. For instance, data subsets pertaining to Ford owners in Alaska and Women who buy size Large may be identified. In some cases, one or more parent sets of the children subsets (i.e., Ford owners in Alaska, Women who buy size large) may be further identified. As an example, the subset People in Alaska and the subset People who buy size Large may be parent sets of the subsets pertaining to Ford owners in Alaska and Women who buy size Large, respectively. The process may comprise iterating the above process again to find additional interesting children subsets (i.e., drilling down into the DAG) and finding parent subsets of those additional interesting children subsets. For instance, the process may include identifying a subset pertaining to People in Alaska that hunt and a subset pertaining to Men who buy size Large in Green as the additional interesting children subsets. Further, the process may include identifying parent subsets of those additional interesting children subsets, such as a subset pertaining to People that hunt and a subset pertaining to Men who buy size Large, respectively.

One aspect of the present disclosure relates to a method for decomposing data. The method may include receiving an input data set that includes information (e.g., numerical, alpha-numerical, strings, characters, etc.) to be analyzed. The method may include identifying a first set of criteria for analyzing the input data set. The method may include identifying a first data subset of the input data set based at least in part on identifying the first set of criteria, wherein the first data subset is defined by a first set of filters. The method may include identifying a second data subset of the input data set, wherein the second data subset is a subset of the first data subset, and wherein the second data subset is defined by a second set of filters. The method may include identifying a first set of parent sets, wherein each parent set of the first set of parent sets is a subset of the input data set and a superset of the second data subset, and wherein each parent set of the first set of parent sets is defined by a subset of the second set of filters that define the second data subset. It should be noted that each parent set may be defined by a different subset of the first set of filters that define the second data subset. The method may include generating a directed acyclic graph based at least in part on identifying the first set of parent sets, the first data subset, the second data subset, or a combination thereof, and wherein the directed acyclic graph comprises one or more relationships or criterions between one or more of the first set of parent sets, the first data subset, and the second data subset. In some embodiments, the method may also include displaying, via a user interface, the directed acyclic graph to a user. For instance, the method may include, providing via an interactive user interface on a visual display, the directed acyclic graph or a sub portion of the directed acyclic graph to a user, wherein the interactive user interface comprises one or more data visualizations or methods of communication for the directed acyclic graph or a subset of the graph, and wherein the interactive user interface is configured to accept a user input action based on identifying a user interaction with the directed acyclic graph or the sub portion of the directed acyclic graph. In some cases, the user input action may include clicking on a subset or parent set to get more information about it and/or favoriting a subset or parent set in the directed acyclic graph. Other examples of user input actions may include adding a comment pertaining to the directed acyclic graph, assigning the graph to a different user, etc.

Another aspect of the present disclosure relates to a system configured for decomposing data. The system may include means for: receiving an input data set that includes information (e.g., numerical, alpha-numerical, strings, characters, etc.) to be analyzed, identifying a first set of criteria for analyzing the input data set, identifying a first data subset of the input data set based at least in part on identifying the first set of criteria, wherein the first data subset is defined by a first set of filters, identifying a second data subset of the input data set, wherein the second data subset is a subset of the first data subset, and wherein the second data subset is defined by a second set of filters. In some embodiments, the system may include means for identifying a first set of parent sets, wherein each parent set of the first set of parent sets is a subset of the input data set and a superset of the second data subset, and wherein each parent set of the first set of parent sets is defined by a subset of the second set of filters that define the second data subset. It should be noted that each parent set may be defined by a different subset of the first set of filters that define the second data subset. The system may include means for generating a directed acyclic graph based at least in part on identifying the first set of parent sets, the first data subset, the second data subset, or a combination thereof, and wherein the directed acyclic graph comprises one or more relationships or criterions between one or more of the first set of parent sets, the first data subset, and the second data subset. In some embodiments, the system may include means for displaying or communicating, via a user interface, the directed acyclic graph to a user. For instance, the system may include means for providing via an interactive user interface on a visual display, the directed acyclic graph or a sub portion of the directed acyclic graph to a user, wherein the interactive user interface comprises one or more data visualizations for the directed acyclic graph, and wherein the interactive user interface is configured to accept a user input action based on identifying a user interaction with the directed acyclic graph or the sub portion of the directed acyclic graph.

Even another aspect of the present disclosure relates to a non-transient computer-readable storage medium having instructions embodied thereon, the instructions being executable by one or more processors to perform a method for decomposing data. The method may include receiving an input data set that includes information (e.g., numerical, alpha-numerical, strings, characters, etc.) to be analyzed. The method may include identifying a first set of criteria for analyzing the input data set. The method may include identifying a first data subset of the input data set based at least in part on identifying the first set of criteria, wherein the first data subset is defined by a first set of filters. The method may include identifying a second data subset of the input data set, wherein the second data subset is a subset of the first data subset, and wherein the second data subset is defined by a second set of filters The method may include identifying a first set of parent sets, wherein each parent set of the first set of parent sets is a subset of the input data set and a superset of the second data subset, and wherein each parent set of the first set of parent sets is defined by a subset of the second set of filters that define the second data subset. It should be noted that each parent set may be defined by a different subset of the first set of filters that define the second data subset. The method may include generating a directed acyclic graph based at least in part on identifying the first set of parent sets, the first data subset, the second data subset, or a combination thereof, and wherein the directed acyclic graph comprises one or more relationships or criterions between one or more of the first set of parent sets, the first data subset, and the second data subset. In some embodiments, the method may also include displaying, via a user interface, the directed acyclic graph to a user. For instance, the method may include, providing via an interactive user interface on a visual display, the directed acyclic graph or a sub portion of the directed acyclic graph to a user, wherein the interactive user interface comprises one or more data visualizations for the directed acyclic graph, and wherein the interactive user interface is configured to accept a user input action based on identifying a user interaction with the directed acyclic graph or the sub portion of the directed acyclic graph. In some cases, the user input action may include clicking on a subset or parent set to get more information about it and/or favoriting a subset or parent set in the directed acyclic graph. Other examples of user input actions may include adding a comment pertaining to the directed acyclic graph, assigning the graph to a different user, etc.

Yet another aspect of the present disclosure relates to a system configured for decomposing data, the system comprising one or more hardware processors configured by machine-readable instructions to receive an input data set, the input data set including numerical information to be analyzed, identify a first set of criteria for analyzing the input data set, identify a first data subset of the input data set based at least in part on identifying the first set of criteria, wherein the first data subset is defined by a first set of filters, identify a second data subset of the input data set, wherein the second data subset is a subset of the first data subset, and wherein the second data subset is defined by a second set of filters, identify a first set of parent sets, wherein each parent set of the first set of parent sets is a subset of the input data set and a superset of the second data subset, and wherein each parent set of the first set of parent sets is defined by a subset of the second set of filters that define the second data subset, generate a directed acyclic graph based at least in part on identifying the first set of parent sets, the first data subset, the second data subset, or a combination thereof, and wherein the directed acyclic graph comprises one or more relationships or criterions between one or more of the first set of parent sets, the first data subset, and the second data subset, and provide, via an interactive user interface on a visual display, the directed acyclic graph or a sub portion of the directed acyclic graph to a user, wherein the interactive user interface comprises one or more data visualizations for the directed acyclic graph or the sub portion of the directed acyclic graph, and wherein the interactive user interface is configured to accept a user input action based on identifying a user interaction with the directed acyclic graph or the sub portion of the directed acyclic graph.

Some examples of the method, system, and non-transitory computer-readable storage medium described above may further include processes, features, means, or instructions for iteratively repeat identifying one or more parent sets of the first set of parent sets such that at least a portion of the one or more parent sets of the first set of parent sets comprise identified parent sets.

Some examples of the method, system, and non-transitory computer-readable storage medium described above may further include processes, features, means, or instructions for iteratively repeat identifying one or more children sets of the first set of parent sets such that at least a portion of the one or more children sets of the first set of parent sets comprise identified children sets.

Some examples of the method, system, and non-transitory computer-readable storage medium described above may further include processes, features, means, or instructions for identifying a third data subset of the input data set, wherein the second data subset is defined by a third set of filters.

Some examples of the method, system, and non-transitory computer-readable storage medium described above may further include processes, features, means, or instructions for identifying a second set of parent sets, wherein each parent set of the second set of parent sets is a subset of the input data set and a superset of the second or the third data subset, and wherein each parent set of the second set of parent sets is defined by a subset of the third set of filters that define the third data subset.

Some examples of the method, system, and non-transitory computer-readable storage medium described above may further include processes, features, means, or instructions for splitting data associated with the first set of criteria into a subset associated with a first criteria of the first set of criteria, and wherein the subset associated with the first criteria is defined by a first filter of the first set of filters.

Some examples of the method, system, and non-transitory computer-readable storage medium described above may further include processes, features, means, or instructions for further splitting data from the subset associated with the first criteria into further subsets defined by one or more subsequent filters and at least the first filter until a termination condition is reached.

In some examples of the method, system, and non-transitory computer-readable storage medium described above, identifying the first set of criteria for analyzing the input data set includes utilization of at least one heuristics input.

In some examples of the method, system, and non-transitory computer-readable storage medium described above the at least one heuristics input includes user behavior, hyperparameters or key business performance indicators. In some examples of the method, system, and non-transitory computer-readable storage medium described above the at least one heuristics input is adapted to select a specific subset. In some examples of the method, system, and non-transitory computer-readable storage medium described above the at least one heuristics input is a divergence of a statistic or set of statistics for the first data subset from the statistic or set of statistics for at least one parent set of the first set of parent sets.

Some examples of the method, system, and non-transitory computer-readable storage medium described above may further include processes, features, means, or instructions for merging the directed acyclic graph or the sub portion of the directed acyclic graph with a second previously generated directed acyclic graph.

Some examples of the method, system, and non-transitory computer-readable storage medium described above may further include processes, features, means, or instructions for identifying at least one node in the directed acyclic graph, determining whether the at least one node meets defined criteria based on a heuristic, removing the at least one node from the directed acyclic graph based on the defined criteria, and/or determining whether a predefined stopping condition has been met based on the removing.

In some examples of the method, system, and non-transitory computer-readable storage medium described above the first data subset of the input data set is identified using unsupervised machine learning. In some examples of the method, system, and non-transitory computer-readable storage medium described above identifying the first data subset of the input data set includes using at least one business metric as further input data. In some examples of the method, system, and non-transitory computer-readable storage medium described above identifying the first data subset of the input data set includes using an intrinsic heuristic as further input data.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
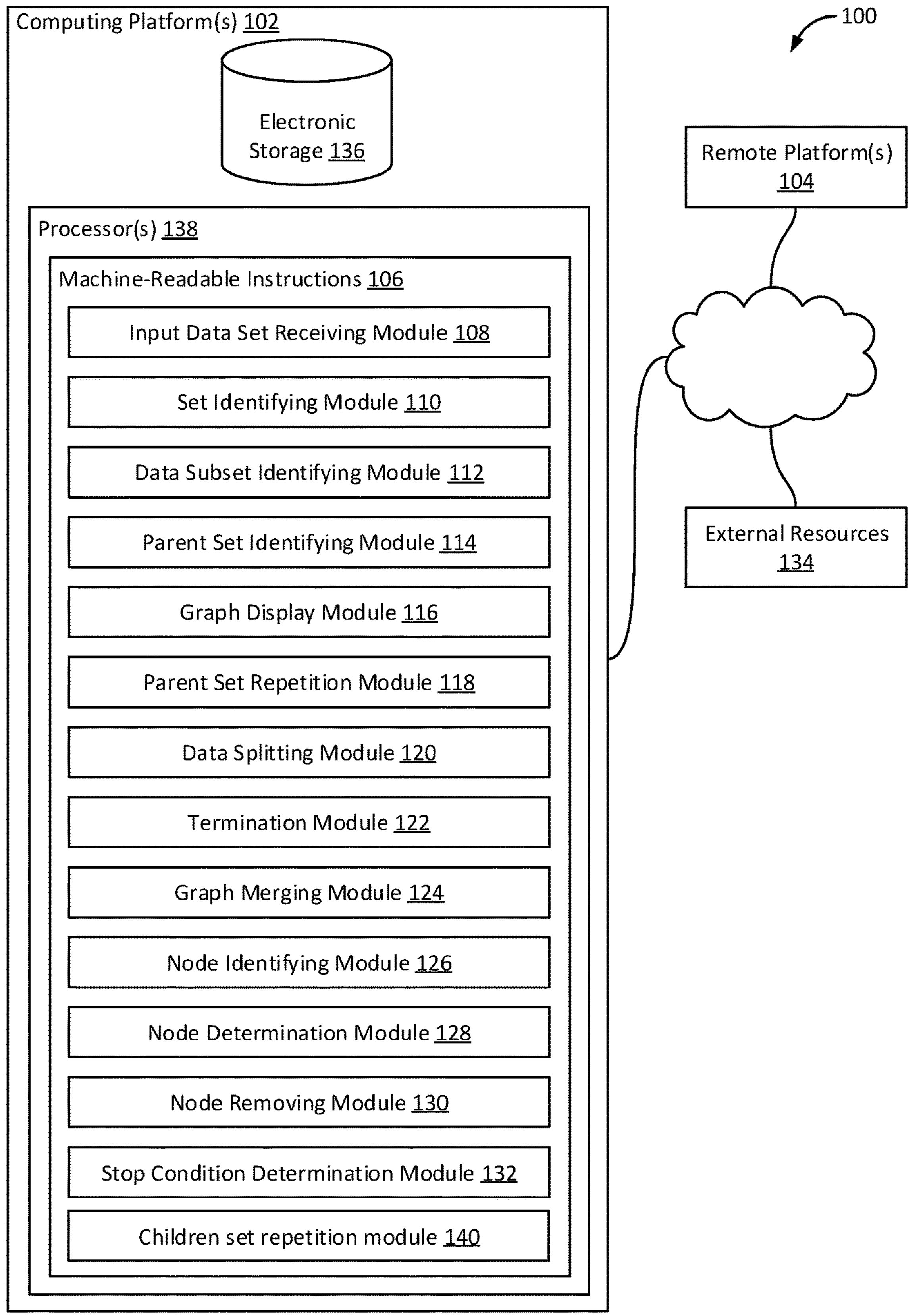
FIG. 1 illustrates a system configured for decomposing data, in accordance with one or more implementations.

Data analysis is a process of "drilling into" data. For instance, data analysis comprises starting with a large set of data (i.e., the data universe) and progressively choosing aspects of the data to filter until arriving at smaller and smaller subsets. The decision to go from the universe (or a subset of the data universe) to a smaller subset may be achieved by looking at a variable and the various values of that variable, and the relation between a given metric (or a set of metrics) across the subsets of the data to the various values of that variable.

As an example, a merchant analyzing clothing sales may divide the data by clothing department (e.g., men's, women's, children, etc.). In some cases, the merchant may visualize the data using a bar chart, where the bar chart shows an average sales value for each department. The merchant may further "dig into" the data by viewing charts for color, size, price, etc., under each department. For instance, the merchant may choose to view a chart of sales value by color under "Women's Department". In some regards, one can represent the data subsets for clothing sales value by a vector, where more and more dimensions to the vector may be added as the merchant drills deeper into the data. For instance, the example above may be described using a vector [Department, Color], with the coordinates of a subset being [Women's, Red].

Current techniques for data analysis, especially decomposing and visualizing data, are limiting in nature. In some cases, decision trees may be utilized for making decisions based on data. A decision tree may be an example of a "true tree", and may comprise a single root with each node in the tree having one parent. In some other cases, the predictive power of multiple decision trees, each of them slightly different, may be utilized for data analysis. In some circumstances, such a technique may be referred to as a random forest. In some cases, a given input and an algorithm may be executed for each tree in the random forest. The output of the algorithm may be computed for different decision trees using the given input. In some cases, data analysis using a random forest may comprise ranking different output values with respect to each other and voting on the same. While random forests allow multiple decision trees to be analyzed at once, they may be less intuitive, and thus less useful, for human understanding when compared to single decision trees, since the only way of understanding the splitting being used is via a simple weighting of the various features used to split the trees.

In graph theory, a directed acyclic graph (DAG) is the general concept that encompasses trees, since a DAG may be used to represent or model trees. In some cases, a DAG may refer to a finite directed graph with no directed cycles, and may be used to model probabilities, connectivity, and/or causality. Like a tree, the structure of a DAG may comprise one or more nodes, and optionally a root. However, unlike a tree, in some cases, a given node in a DAG may comprise multiple parents. As an example, an actual analysis of relationships in a family may be represented using a DAG, although such an analysis is often informally referred to as a "family tree". For instance, an analysis of relationships in a family may start with a single individual (or a couple) and tracing their progeny through time. Each person may have two biological parents, implying that there is no "root" of the tree. Further, tracing up from a current individual will lead to $2^1$ parents, $2^2$ grandparents, $2^3$ great grandparents, etc. Contrastingly, tracing down from those grandparents or great grandparents will lead to a large number of descendants.

In some cases, useful business insight may be gathered by comparing data sets or subsets through decomposition of data into a DAG. In some cases, data subsets may be represented by nodes in a DAG. Further, a data subset may comprise one or more parents and/or children, referred to as parent sets and children subsets, respectively. In some aspects, a DAG may facilitate the presentation of the relationships between different data subsets of an input dataset in a graphical and user friendly manner.

Aspects disclosed herein relate to a system and process that is capable of comparing data sets and/or subsets through decomposition into a DAG. In some cases, the system and process of the present disclosure may be directed to utilizing one or more of unsupervised, semi-supervised, and supervised machine learning techniques to identify subsets and/or patterns of an input dataset. Additionally or alternatively, the system may identify potentially interesting subsets (i.e., subsets comprising notable characteristics, meeting a defined filter or set of filters, etc.) of the input data set through the use of one or more heuristic inputs for decision making. Some examples of heuristic inputs may include Key Performance Indicators (KPIs), user behavior, hyperparameters, etc. Aspects of the disclosure are further illustrated by and described with reference to apparatus diagrams, systems diagrams, and flowcharts that relate to the comparison of data sets and/or subsets through decomposition into a DAG.

For the purposes of this disclosure, the term "pattern" may relate to the attributes that define a subset of data and possibly a relationship to associated statistics, which in some cases may be relative to another subset. One example of a pattern may be that men in Alaska spend two times the average of an input dataset. That is, if the statistics of a spend column in a subset (i.e., derived from an input dataset) that only includes records where "State=Alaska" and "Gender=Male" are both true are considered, the statistics of the spend column in the subset would be twice the average of the spend column for the whole input dataset. Furthermore, for the purposes of this disclosures, the terms "data subset", "segment", "subset", and "subgroup" may be used interchangeably through the application. Lastly, for the purposes of this disclosure, an input dataset may also be referred to as a root or root dataset. Further, any references to the display of these subsets to one or more users is synonymous with simplified representations of the subsets or the display of the filters that can define the subset.

The words "for example" is used herein to mean "serving as an example, instance, or illustration." Any embodiment described herein as "for example" is not necessarily to be construed as preferred or advantageous over other embodiments.

The flowcharts and block diagrams in the following figures illustrate the architecture, functionality, and operation of possible implementations of devices, systems, methods, and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

FIG. 1 illustrates a system 100 configured for decomposing data, in accordance with one or more implementations. In some implementations, system 100 may include one or more servers 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction modules. The instruction modules may include computer program modules. The instruction modules may include one or more of input data set receiving module 108, set identifying module 110, data subset identifying module 112, parent set identifying module 114, graph display module 116, parent set repetition module 118, data splitting module 120, termination module 122, graph merging module 124, node identifying module 126, node determination module 128, node removing module 130, stop condition determination module 132, and/or other instruction modules.

Input data set receiving module 108 may be configured to receive an input data set. The input data set may include information to be analyzed, such as numerical and/or alphanumerical information.

Set identifying module 110 may be configured to identify a first set of criteria to be used in analyzing the input data set. Identifying a set of criteria to be used in analyzing the input data set may include utilization of at least one heuristics input. By way of non-limiting example, at least one heuristics input may include user behavior, hyperparameters or key business performance indicators. In some embodiments, criteria may also include one or more filters on the data. Some examples of filters may include a cell equaling a value, a cell containing a given value, a cell being in a given range, a cell mapping to another value being explored (e.g. a date may be used to derive if a given day falls on a weekend or a weekday, where the filter is weekday), etc., to name a few non-limiting examples.

Data subset identifying module 112 may be configured to identify a first or second data subset of the input data set based in part on identifying the first set of criteria for analyzing the input data set. The first data subset may be defined by a first set of filters, and the second data subset may be defined by a second set of filters. The second data subset may be a subset (e.g., a child set) of the first data subset. In some cases, identifying a data subset (e.g., first data subset, second data subset, etc.) of the input data set may be completed using unsupervised machine learning. In some other cases, identifying a data subset of the input data set may be completed using one or more of semi-supervised or supervised machine learning. In some circumstances, identifying a first or second data subset of the input data set may include using at least one business metric as further input data. In some other cases, identifying a first or second data subset of the input data set may include using an intrinsic or a derived heuristic as further input data. At least one heuristic input may be adapted to select a specific subset. Additionally or alternatively, at least one heuristic input may be a divergence of a given statistic or set of statistics about a subset (e.g., the second data subset) from the same statistic or statistics from one or more parent sets (e.g., the first data subset) of the first set of parent sets. As an example, if men on average spend 10% more than average, and people in California spend 10% more than average, an example of a heuristics input may be based on men in California spending 50% more than average. In such cases, the subset and pattern associated with men in California may be termed as comprising a notable characteristic (i.e., interesting), for instance, based on a divergence of the statistics of the subset meeting filters [California, Men] from its parent sets [Men] and [California]. If however, men in California with bowties spend 51% more than average, a subset meeting filters [California, Men, Bowties] may not be classified as interesting or comprising a notable characteristic, since the statistics for that subset is fairly close to its parent set [California, Men]. In some embodiments, data subset identifying module 112 may also be configured to identify a third data subset of the input data set, where the third data subset is defined by a third set of filters. In some cases, the third data subset may be a child subset of the first and/or the second data subset. Alternatively, the third data subset may be non-adjacent to the second data subset.

Parent set identifying module 114 may be configured to identify one or more first parent sets. The one or more first parent sets may be subsets of the input data set, as well as supersets of the first data subset and/or the second data subset. In some cases, each parent set of the first set of parent sets may be defined by a subset of the first set of filters or the second set of filters that define the first data subset or the second data subset, respectively. In other cases, the one or more first parent sets may be defined by a plurality of subsets of the first set of filters or the second set of filters that define the first data subset or the second data subset, respectively. In some embodiments, parent set identifying module 114 may also be configured to identify one or more second parent sets. The one or more second parent sets may be subsets of the input data set and/or supersets of the third data subset. The one or more second parent sets may be defined by a subset of the third set of filters that define the third data subset. In some cases, each parent set of the second parent sets may be defined by a subset of the third set of filters that define the third data subset. It should be noted that each parent set of the first or second sets of parent sets may be defined by different subsets of the set of filters that define the second data subset or the third data subset, respectively.

Graph display module 116 may be configured to first, generate a directed acyclic graph based at least in part on identifying one or more of the first set of parent sets, the first data subset, and the second data subset, wherein the directed acyclic graph comprises one or more relationships or criterions between one or more of the first set of parent sets, the first data subset, and the second data subset. Then, the graph display module 116 may be configured to display the directed acyclic graph or a sub portion of the directed acyclic graph, including one or more of the first set of parent sets, the first data subset, and/or the second data subset of the input data set to a user. For instance, the graph display module 116 may be configured to provide, via an interactive user interface on a visual display, the directed acyclic graph or a sub portion of the directed acyclic graph to a user, wherein the interactive user interface comprises one or more data visualizations for the directed acyclic graph or the sub portion of the directed acyclic graph, and wherein the interactive user interface is configured to accept a user input action based on identifying a user interaction with the directed acyclic graph or the sub portion of the directed acyclic graph.

Parent set repetition module 118 may be configured to iteratively repeat identifying one or more parent sets of the first set of parent sets such that at least a portion of the one or more parent sets of the first set of parent sets comprise identified parent sets.

Data splitting module 120 may be configured to split the data associated with the first set of criteria into a subset associated with a first criteria of the first set of criteria, and wherein the subset associated with the first criteria is defined by a first filter of the first set of filters. Data splitting module 120 may also be configured to further split data from the subset associated with the first criteria into further subsets defined by one or more subsequent filters and at least the first filter until a termination condition is reached.

Termination module 122 may be configured to further process the data associated with the first set of criteria into a further subset defined by a subsequent filter until a termination or stopping criteria is reached.

Graph merging module 124 may be configured to merge the directed acyclic graph or a sub portion of the directed acyclic graph with a second previously generated directed acyclic graph (or a sub portion of the second previously generated directed acyclic graph).

Node identifying module 126 may be configured to identify at least one node on the directed acyclic graph.

Node determination module 128 may be configured to determine whether at least one node meets a defined-criteria based on a heuristic.

Node removing module 130 may be configured to remove at least one node from the directed acyclic graph, for instance, based on the defined criteria or the heuristic.

Stop condition determination module 132 may be configured to determine whether a predefined stopping condition has been met based on the removing.

Children set repetition module 140 may be configured to iteratively repeat identifying one or more children sets of the first set of parent sets such that at least a portion of the one or more children sets of the first set of parent sets comprise identified children sets. Additionally or alternatively, children set repetition module 140 may be configured to iteratively repeat identifying one or more children sets of the second set of parent sets such that at least a portion of the one or more children sets of the second set of parent sets comprise identified children sets.

In some implementations, server(s) 102, client computing platform(s) 104, and/or external resources 134 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 134 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 134, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 134 may include sources of information outside of system 100, external entities participating with system 100, and/or other resources. In some implementations, some or all of the functionality attributed herein to external resources 134 may be provided by resources included in system 100.

Server(s) 102 may include electronic storage 136, one or more processors 138, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 136 may comprise non-transitory storage media that electronically stores information. The electronic storage media of electronic storage 136 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 136 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 136 may include one or more virtual storage resources (e.g., cloud storage, a virtual private network, and/or other virtual storage resources). Electronic storage 136 may store software algorithms, information determined by processor(s) 138, information received from server(s) 102, information received from client computing platform(s) 104, and/or other information that enables server(s) 102 to function as described herein.

Processor(s) 138 may be configured to provide information processing capabilities in server(s) 102. As such, processor(s) 138 may include one or more of a digital processor, an analog processor, a digital circuit designed to process information, an analog circuit designed to process information, a state machine, and/or other mechanisms for electronically processing information. Although processor(s) 138 is shown in FIG. 1 as a single entity, this is for illustrative purposes only. In some implementations, processor(s) 138 may include a plurality of processing units. These processing units may be physically located within the same device, or processor(s) 138 may represent processing functionality of a plurality of devices operating in coordination. Processor(s) 138 may be configured to execute modules 108, 110, 112, 114, 116, 118, 120, 122, 124, 126, 128, 130, 132, and/or 140, and/or other modules. Processor(s) 138 may be configured to execute modules 108, 110, 112, 114, 116, 118, 120, 122, 124, 126, 128, 130, 132, and/or 140, and/or other modules by software; hardware; firmware; some combination of software, hardware, and/or firmware; and/or other mechanisms for configuring processing capabilities on processor(s) 138. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 108, 110, 112, 114, 116, 118, 120, 122, 124, 126, 128, 130, 132, and/or 140 are illustrated in FIG. 1 as being implemented within a single processing unit, in implementations in which processor(s) 138 includes multiple processing units, one or more of modules 108, 110, 112, 114, 116, 118, 120, 122, 124, 126, 128, 130, 132, and/or 140 may be implemented remotely from the other modules. The description of the functionality provided by the different modules 108, 110, 112, 114, 116, 118, 120, 122, 124, 126, 128, 130, 132, and/or 140 described below is for illustrative purposes, and is not intended to be limiting, as any of modules 108, 110, 112, 114, 116, 118, 120, 122, 124, 126, 128, 130, 132, and/or 140 may provide more or less functionality than is described. For example, one or more of modules 108, 110, 112, 114, 116, 118, 120, 122, 124, 126, 128, 130, 132, and/or 140 may be eliminated, and some or all of its functionality may be provided by other ones of modules 108, 110, 112, 114, 116, 118, 120, 122, 124, 126, 128, 130, 132, and/or 140. As another example, processor(s) 138 may be configured to execute one or more additional modules that may perform some or all of the functionality attributed below to one of modules 108, 110, 112, 114, 116, 118, 120, 122, 124, 126, 128, 130, 132, and/or 140.

FIGS. 2A, 2B, 2C, 2D, 2E, and/or 2F illustrate a method 200 for decomposing data, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIGS. 2A, 2B, 2C, 2D, 2E, and/or 2F and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

Figure 2A:
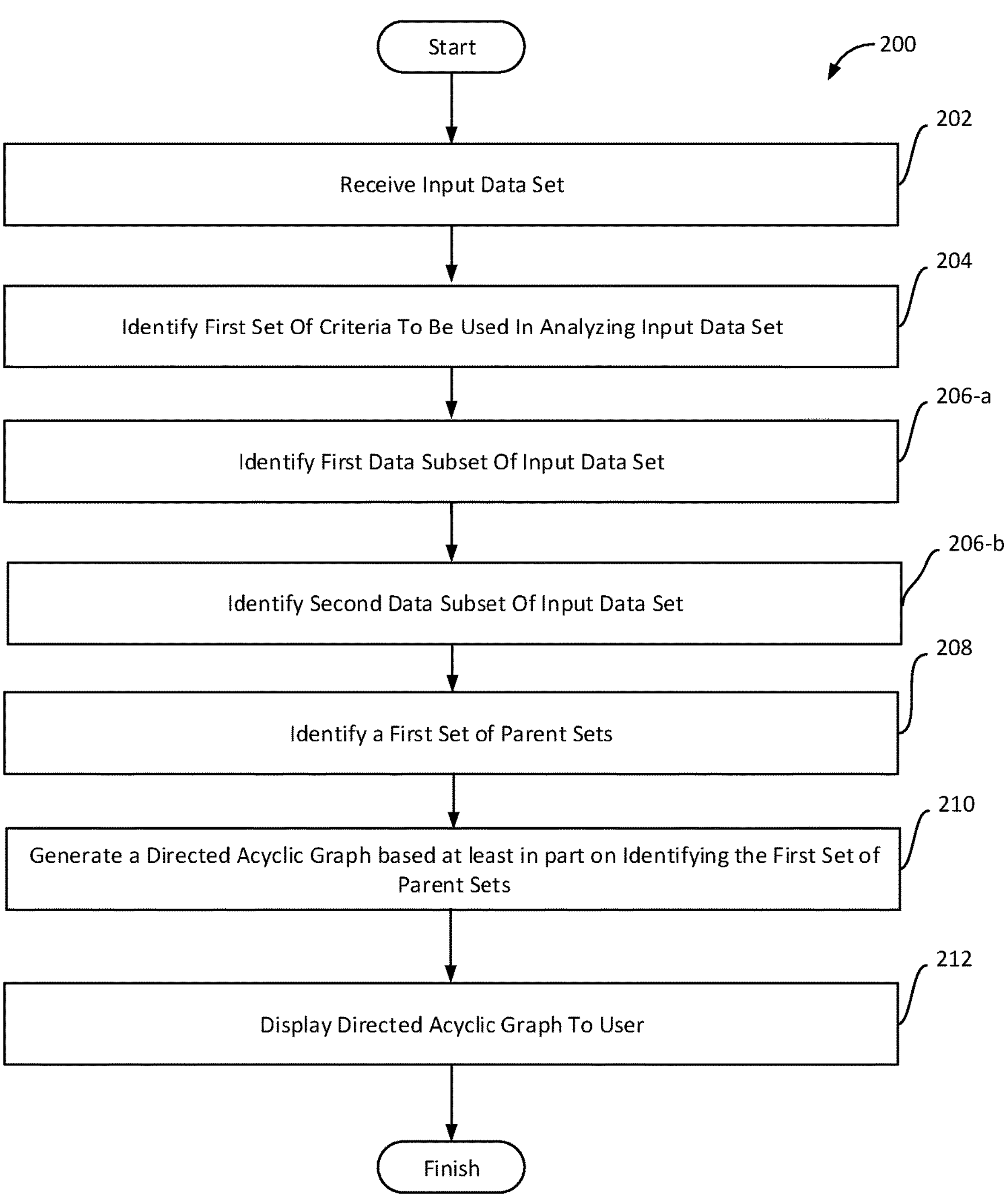
FIGS. 2A, 2B, 2C, 2D, 2E, and/or 2F illustrate a method for decomposing data, in accordance with one or more implementations.

FIG. 2A illustrates method 200, in accordance with one or more implementations.

An operation 202 may include receiving an input data set. The input data set may include information (e.g., numerical, alpha-numerical, characters, strings, etc.) to be analyzed. Operation 202 may be performed by one or more hardware processors configured by machine-readable instructions including a module that is the same as or similar to input data set receiving module 108, in accordance with one or more implementations.

An operation 204 may include identifying a first set of criteria for analyzing the input data set. Operation 204 may be performed by one or more hardware processors configured by machine-readable instructions including a module that is the same as or similar to set identifying module 110, in accordance with one or more implementations.

An operation 206-*a* may include identifying a first data subset of the input data set based at least in part on identifying the first set of criteria, where the first data subset may be defined by a first set of filters. Operation 206-*a* may be performed by one or more hardware processors configured by machine-readable instructions including a module that is the same as or similar to data subset identifying module 112, in accordance with one or more implementations.

An operation 206-*b* may include identifying a second data subset of the input data set, wherein the second data subset is a subset of the first data subset, and wherein the second data subset is defined by a second set of filters. That is, the second data subset may be a child subset of the first data subset. Alternatively, the first data subset may be a parent set of the second data subset. In some embodiments, the first set of filters may be a subset of the second set of filters. Operation 206-*b* may be performed by one or more hardware processors configured by machine-readable instructions including a module that is the same as or similar to data subset identifying module 112, in accordance with one or more implementations An operation 208 may include identifying a first set of parent sets (i.e., one or more first parent sets). In some cases, each parent set of the first set of parent sets may be a subset of the input data set and a superset of the second data subset. Furthermore, each parent set of the first set of parent sets may be defined by a subset of the second set of filters that define the second data subset. That is, the one or more first parent sets may be subsets of the input data set and may include supersets of the second data subset, where the one or more first parent sets may be defined by a plurality of subsets of the second set of filters that define the second data subset. Operation 208 may be performed by one or more hardware processors configured by machine-readable instructions including a module that is the same as or similar to parent set identifying module 114, in accordance with one or more implementations.

An operation 210 may include generating a directed acyclic graph based at least in part on identifying the first set of parent sets, the first data subset, the second data subset, or a combination, wherein the directed acyclic graph comprises one or more relationships or criterions between the first set of parent sets, the first data subset, and/or the second data subset. Operation 210 may be performed by one or more hardware processors configured by machine-readable instructions including a module that is the same as or similar to graph display module 116, in accordance with one or more implementations An operation 212 may include providing, via an interactive user interface on a visual display, the directed acyclic graph or a sub portion of the directed acyclic graph to a user. Operation 210 may be performed by one or more hardware processors configured by machine-readable instructions including a module that is the same as or similar to graph display module 116, in accordance with one or more implementations. In some embodiments, the graph display module 116 may be configured to display, the directed acyclic graph or a sub portion of the directed acyclic graph to a user, where the interactive user interface comprises one or more data visualizations for the directed acyclic graph (or the sub portion of the directed acyclic graph), and where the interactive user interface is configured to accept a user input action based on identifying a user interaction with the directed acyclic graph (or the sub portion of the directed acyclic graph).

Figure 2B:
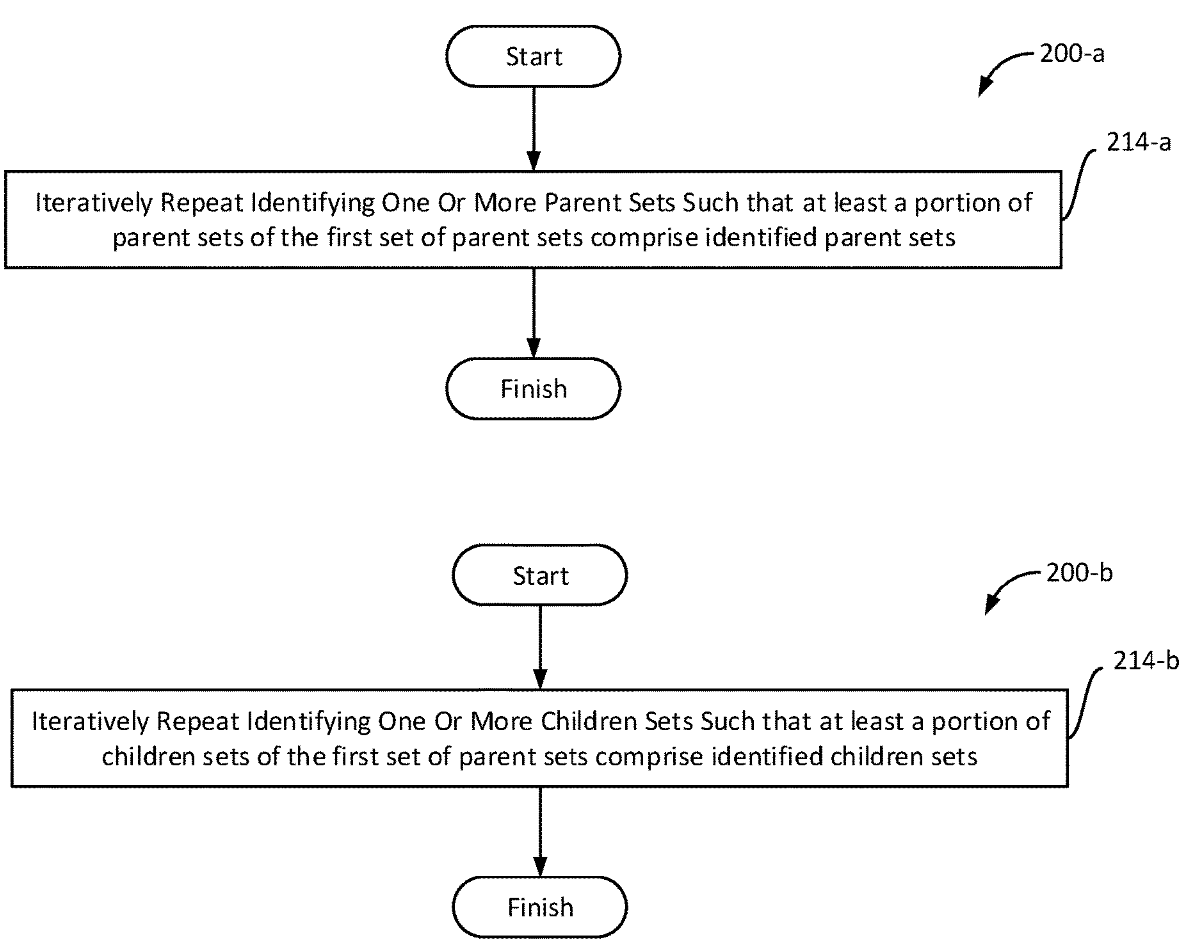

FIG. 2B illustrates methods 200-*a* and 200-*b*, in accordance with one or more implementations.

As shown in method 200-*a*, an operation 214-*a* may include iteratively (repeat) identifying one or more parent sets of the first set of parent sets such that at least a portion of the one or more parent sets of the first set of parent sets comprise identified parent sets. In other words, at least some number of the one or more first parents sets also have identified parent sets. Operation 214 may be performed by one or more hardware processors configured by machine-readable instructions including a module that is the same as or similar to parent set repetition module 118, in accordance with one or more implementations.

In some embodiments, and as shown in method 200-*b*, an operation 214-*b* may include iteratively (repeat) identifying one or more children sets of the first set of parent sets such that at least a portion of the one or more children sets of the first set of parent sets comprise identified children sets. In other words, at least some number of the one or more children sets also have identified children sets. Operation 214-*b* may be performed by one or more hardware processors configured by machine-readable instructions including a module that is the same as or similar to children set repetition module 140, in accordance with one or more implementations.

Figure 2C:
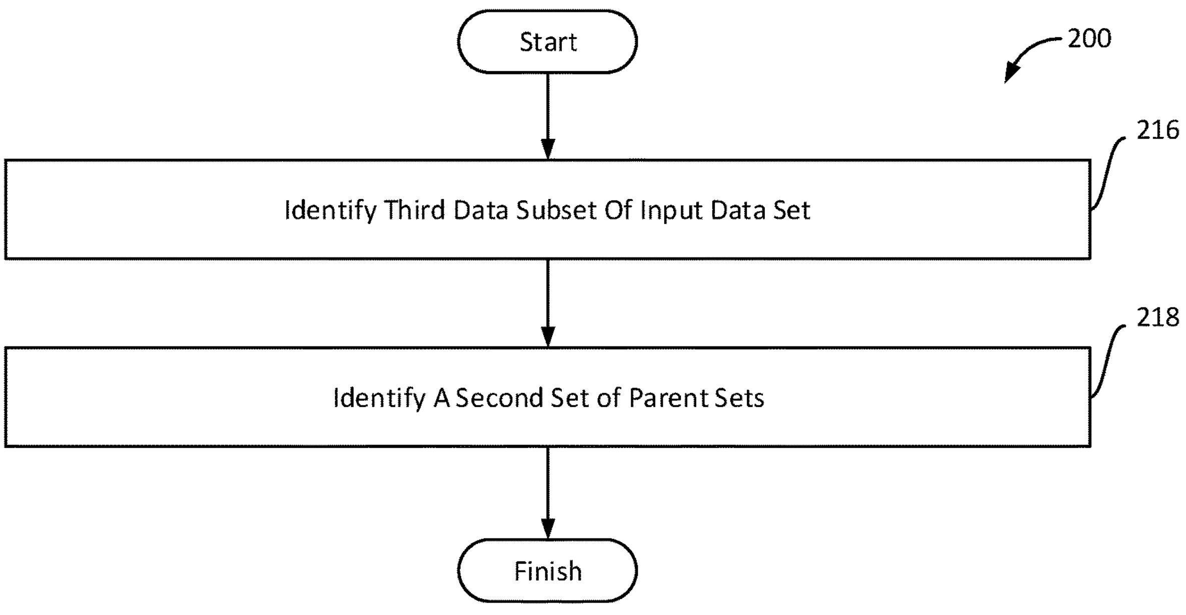

FIG. 2C illustrates method 200, in accordance with one or more implementations.

An operation 216 may include identifying a third data subset of the input data set, where the third data subset may be defined by a third set of filters. Operation 216 may be performed by one or more hardware processors configured by machine-readable instructions including a module that is the same as or similar to data subset identifying module 112, in accordance with one or more implementations.

An operation 218 may include identifying a second set of parent sets (i.e., one or more second parent sets), where each parent set of the second set of parent sets may be a subset of the input data set and a superset of the second or the third data subset, and where each parent set of the second set of parent sets may be defined by a subset of the third set of filters that define the third data subset. That is, the one or more second parent sets may be subsets of the input data set and include supersets of the third data subset, where the one or more second parent sets may be defined by a plurality of subsets of the filters that define the third data subset. In some cases, different parent sets of the second set of parent sets may be defined by different subsets of the third set of filters. Operation 218 may be performed by one or more hardware processors configured by machine-readable instructions including a module that is the same as or similar to parent set identifying module 114, in accordance with one or more implementations.

Figure 2D:
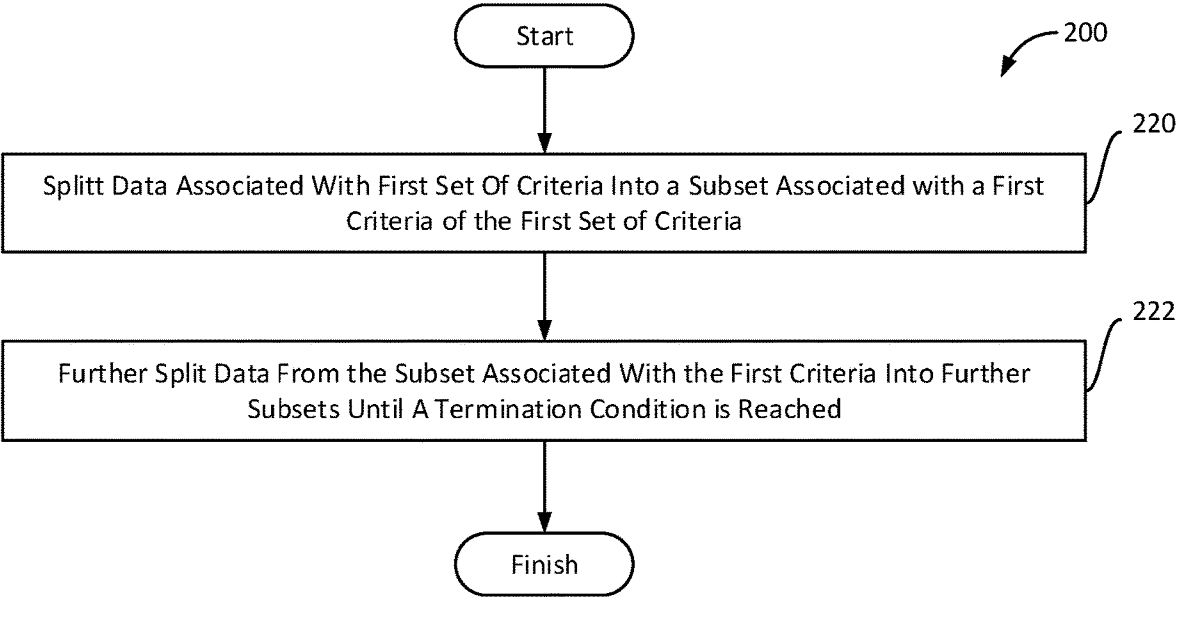

FIG. 2D illustrates method 200, in accordance with one or more implementations.

An operation 220 may include splitting the data associated with the first set of criteria into a subset associated with a first criteria of the first set of criteria, where the subset associated with the first criteria is defined by a first filter of the first set of filters. For instance, the first set of criteria may comprise one or more criteria (e.g., heuristics, such as average price, similarity of records, low standard deviation on a metric, etc.), and one or more hardware processors may be configured by machine-readable instructions to split data associated with the first set of criteria into a subset associated with a first criteria of the first set of criteria, a second subset associated with a second criteria of the first set of criteria, etc. Operation 220 may be performed by one or more hardware processors configured by machine-readable instructions including a module that is the same as or similar to data splitting module 120, in accordance with one or more implementations.

An operation 222 may include further splitting data from the subset associated with the first criteria into further subsets defined by one or more subsequent filters and at least the first filter until a termination or stopping condition is reached. That is, operation 222 may include further splitting data associated with the first criteria and defined by the first filter into further subsets defined by subsequent filters of the first set of filters until a termination criteria is reached. Operation 222 may be performed by one or more hardware processors configured by machine-readable instructions including a module that is the same as or similar to termination module 122, in accordance with one or more implementations.

Figure 2E:
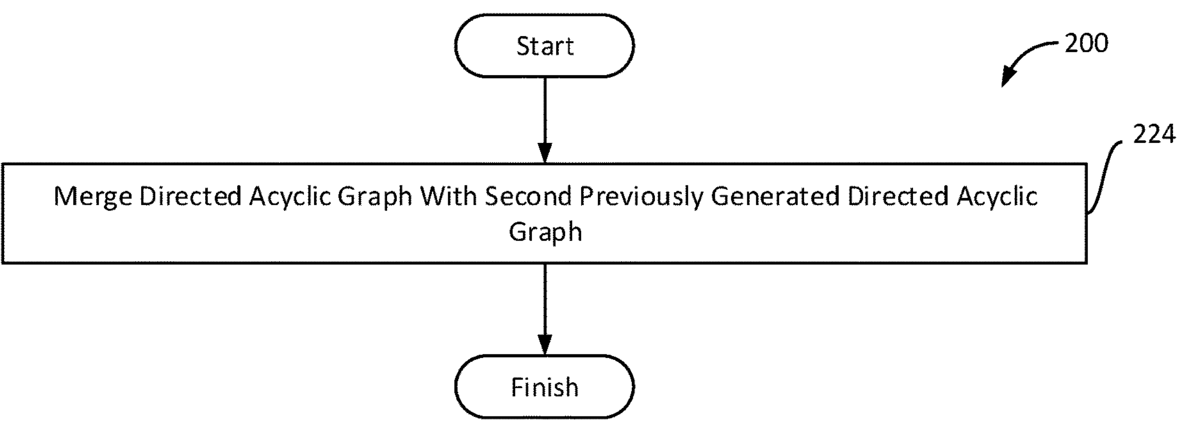

FIG. 2E illustrates method 200, in accordance with one or more implementations.

An operation 224 may include further including merging the directed acyclic graph or the sub portion of the directed acyclic graph with a second previously generated directed acyclic graph (or a sub portion of the second previously generated directed acyclic graph). Operation 224 may be performed by one or more hardware processors configured by machine-readable instructions including a module that is the same as or similar to graph merging module 124, in accordance with one or more implementations.

Figure 2F:
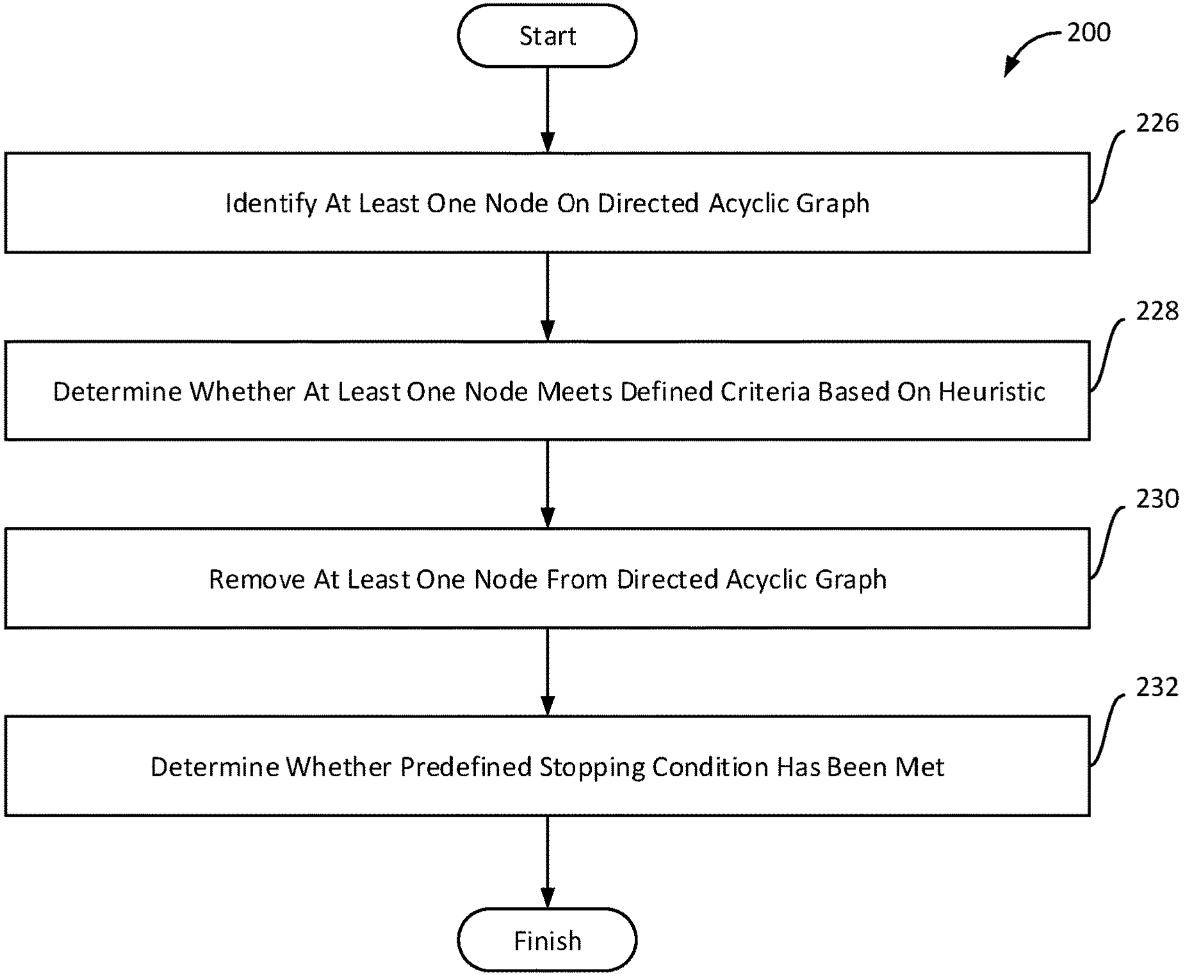

FIG. 2F illustrates method 200, in accordance with one or more implementations.

An operation 226 may include identifying at least one node on the directed acyclic graph (or the sub portion of the directed acyclic graph). Operation 226 may be performed by one or more hardware processors configured by machine-readable instructions including a module that is the same as or similar to node identifying module 126, in accordance with one or more implementations.

An operation 228 may include determining whether at least one node meets a defined-criteria based on a heuristic. Operation 228 may be performed by one or more hardware processors configured by machine-readable instructions including a module that is the same as or similar to node determination module 128, in accordance with one or more implementations.

An operation 230 may include removing at least one node from the directed acyclic graph based in part on the defined criteria. Operation 230 may be performed by one or more hardware processors configured by machine-readable instructions including a module that is the same as or similar to node removing module 130, in accordance with one or more implementations.

An operation 232 may include determining whether a predefined stopping condition has been met based on the removing. Operation 232 may be performed by one or more hardware processors configured by machine-readable instructions including a module that is the same as or similar to stop condition determination module 132, in accordance with one or more implementations.

Figure 3:
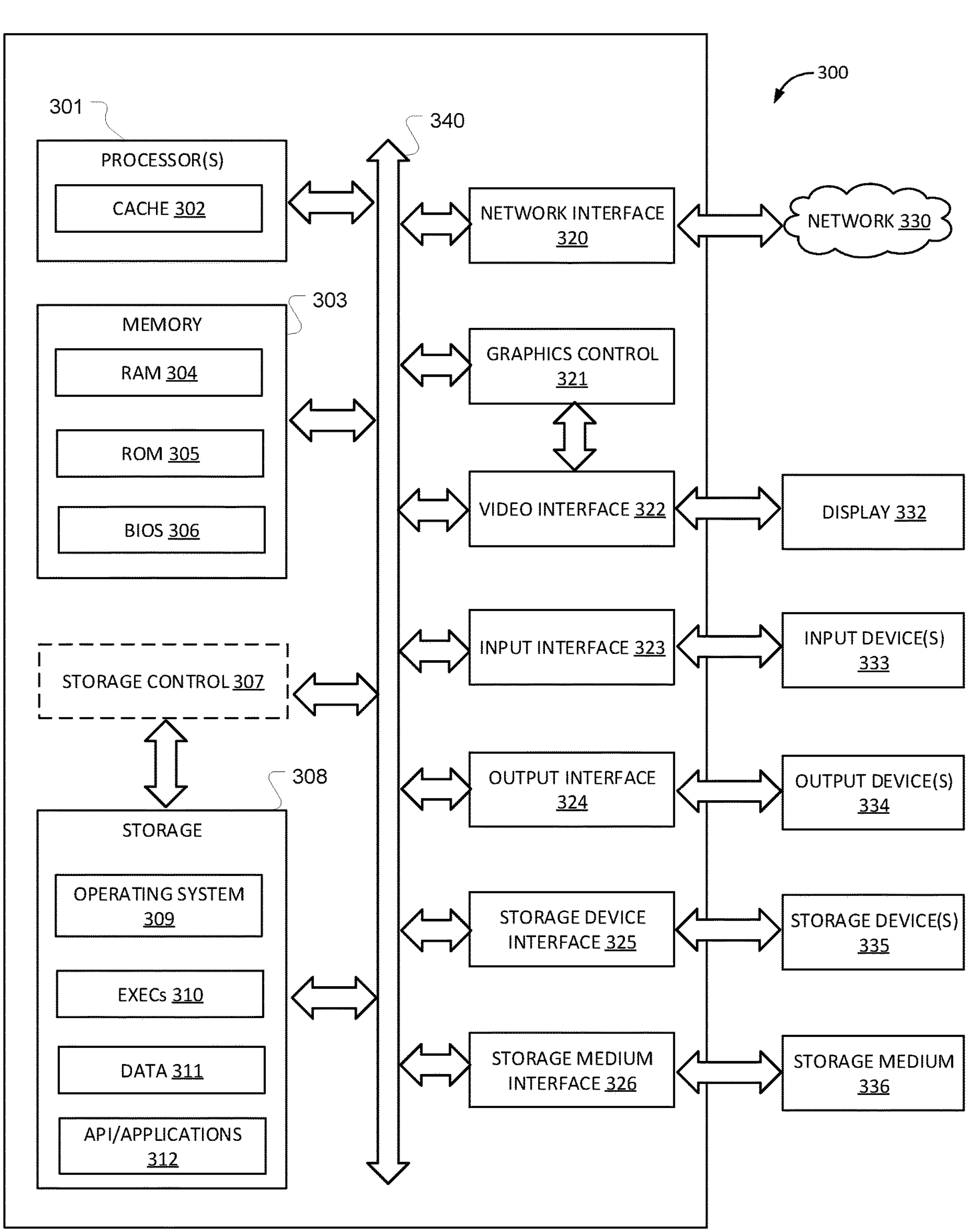
FIG. 3 illustrates another embodiment of a system configured for comparing non-adjacent data subsets, in accordance with one or more implementations.

Referring to FIG. 3, it is a block diagram depicting an exemplary machine that includes a computer system 300 within which a set of instructions can execute for causing a device to perform or execute any one or more of the aspects and/or methodologies of the present disclosure. The components in FIG. 3 are examples only and do not limit the scope of use or functionality of any hardware, software, embedded logic component, or a combination of two or more such components implementing particular embodiments.

Computer system 300 may include a processor 301, a memory 303, and a storage 308 that communicate with each other, and with other components, via a bus 340. The bus 340 may also link a display 332, one or more input devices 333 (which may, for example, include a keypad, a keyboard, a mouse, a stylus, etc.), one or more output devices 334, one or more storage devices 335, and various tangible storage media 336. All of these elements may interface directly or via one or more interfaces or adaptors to the bus 340. For instance, the various tangible storage media 336 can interface with the bus 340 via storage medium interface 326. Computer system 300 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 301 (or central processing unit(s) (CPU(s))) optionally contains a cache memory unit 302 for temporary local storage of instructions, data, or computer addresses. Processor(s) 301 are configured to assist in execution of computer readable instructions. Computer system 300 may provide functionality for the components depicted in FIGS. 1 through 2F as a result of the processor(s) 301 executing non-transitory, processor-executable instructions embodied in one or more tangible computer-readable storage media, such as memory 303, storage 308, storage devices 335, and/or storage medium 336. The computer-readable media may store software that implements particular embodiments, and processor(s) 301 may execute the software. Memory 303 may read the software from one or more other computer-readable media (such as mass storage device(s) 335, 336) or from one or more other sources through a suitable interface, such as network interface 320. The software may cause processor(s) 301 to carry out one or more processes or one or more steps of one or more processes described or illustrated herein. Carrying out such processes or steps may include defining data structures stored in memory 303 and modifying the data structures as directed by the software.

The memory 303 may include various components (e.g., machine readable media) including, but not limited to, a random-access memory component (e.g., RAM 304) (e.g., a static RAM "SRAM", a dynamic RAM "DRAM, etc.), a read-only component (e.g., ROM 305), and any combinations thereof. ROM 305 may act to communicate data and instructions unidirectionally to processor(s) 301, and RAM 304 may act to communicate data and instructions bidirectionally with processor(s) 301. ROM 305 and RAM 304 may include any suitable tangible computer-readable media described below. In one example, a basic input/output system 306 (BIOS), including basic routines that help to transfer information between elements within computer system 300, such as during start-up, may be stored in the memory 303.

Fixed storage 308 is connected bidirectionally to processor(s) 301, optionally through storage control unit 307. Fixed storage 308 provides additional data storage capacity and may also include any suitable tangible computer-readable media described herein. Storage 308 may be used to store operating system 309, EXECs 310 (executables), data 311, API applications 312 (application programs), and the like. Often, although not always, storage 308 is a secondary storage medium (such as a hard disk) that is slower than primary storage (e.g., memory 303). Storage 308 can also include an optical disk drive, a solid-state memory device (e.g., flash-based systems), or a combination of any of the above. Information in storage 308 may, in appropriate cases, be incorporated as virtual memory in memory 303.

In one example, storage device(s) 335 may be removably interfaced with computer system 300 (e.g., via an external port connector (not shown)) via a storage device interface 325. Particularly, storage device(s) 335 and an associated machine-readable medium may provide nonvolatile and/or volatile storage of machine-readable instructions, data structures, program modules, and/or other data for the computer system 300. In one example, software may reside, completely or partially, within a machine-readable medium on storage device(s) 335. In another example, software may reside, completely or partially, within processor(s) 301.

Bus 340 connects a wide variety of subsystems. Herein, reference to a bus may encompass one or more digital signal lines serving a common function, where appropriate. Bus 340 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 300 may also include an input device 333. In one example, a user of computer system 300 may enter commands and/or other information into computer system 300 via input device(s) 333. Examples of an input device(s) 333 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 333 may be interfaced to bus 340 via any of a variety of input interfaces 323 (e.g., input interface 323) including, but not limited to, serial, parallel, game port, USB, FIREWIRE, THUNDERBOLT, or any combination of the above.

In particular embodiments, when computer system 300 is connected to network 330, computer system 300 may communicate with other devices, specifically mobile devices and enterprise systems, connected to network 330. Communications to and from computer system 300 may be sent through network interface 320. For example, network interface 320 may receive incoming communications (such as requests or responses from other devices) in the form of one or more packets (such as Internet Protocol (IP) packets) from network 330, and computer system 300 may store the incoming communications in memory 303 for processing. Computer system 300 may similarly store outgoing communications (such as requests or responses to other devices) in the form of one or more packets in memory 303 and communicated to network 330 from network interface 320. Processor(s) 301 may access these communication packets stored in memory 303 for processing.

Examples of the network interface 320 include, but are not limited to, a network interface card, a modem, and any combination thereof. Examples of a network 330 or network segment 330 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 330, may employ a wired and/or a wireless mode of communication. In general, any network topology may be used.

Information and data can be displayed through a display 332. Examples of a display 332 include, but are not limited to, a liquid crystal display (LCD), an organic liquid crystal display (OLED), a cathode ray tube (CRT), a plasma display, and any combinations thereof. The display 332 can interface to the processor(s) 301, memory 303, and fixed storage 308, as well as other devices, such as input device(s) 333, via the bus 340. The display 332 is linked to the bus 340 via a video interface 322, and transport of data between the display 332 and the bus 340 can be controlled via the graphics control 321.

In addition to a display 332, computer system 300 may include one or more other peripheral output devices 334 including, but not limited to, an audio speaker, a printer, and any combinations thereof. Such peripheral output devices may be connected to the bus 340 via an output interface 324. Examples of an output interface 324 include, but are not limited to, a serial port, a parallel connection, a USB port, a FIREWIRE port, a THUNDERBOLT port, and any combinations thereof.

In addition, or as an alternative, computer system 300 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Figure 4:
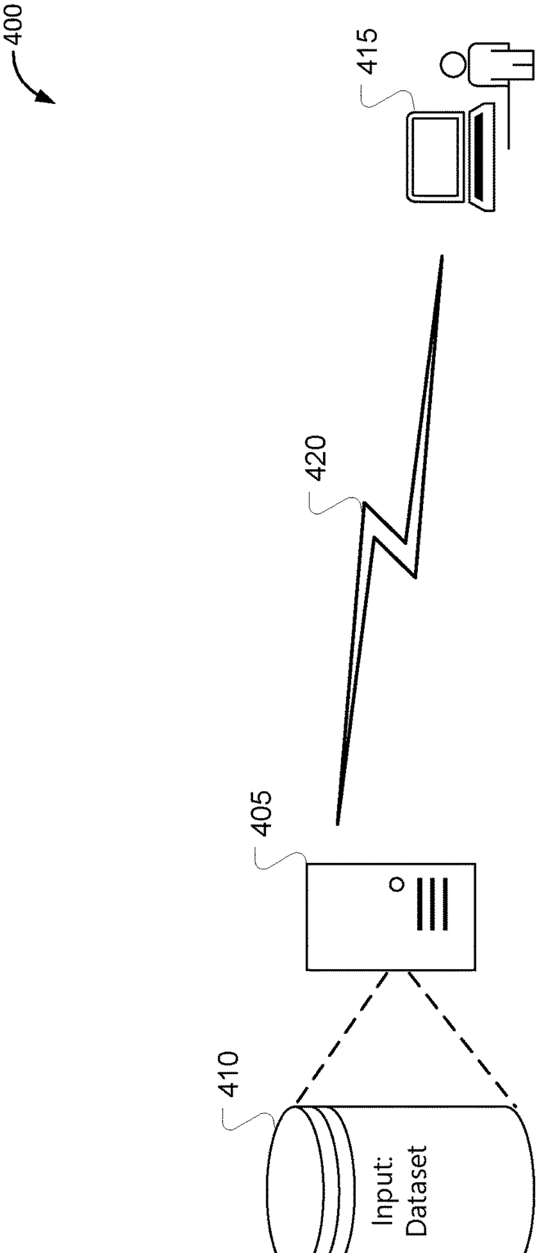
FIG. 4 illustrates a system diagram in accordance with one or more implementations.

FIG. 4 illustrates a system 400 configured for comparing data sets through the decomposition of data into a DAG in accordance with various aspects of the present disclosure. The system 400 may implement one or more aspects of system 100, and may include a server 405 and a user device 415. The user device 415 may be an example of a computing device, such as a computer, a laptop, a net book, a mobile phone, a tablet, to name a few non-limiting examples. In some embodiments, the user device 415 may comprise a visual display for displaying information to a user via a user interface. Further, the user device 415 may be configured to receive input from a user via a mouse, a keyboard, a microphone (i.e., voice recognition), a camera, etc. In some embodiments, the server 405 may also be an example of a computing device and may receive data from a data store or a plurality of databases. For instance, the server 405 may receive a dataset 410 as an input from a data store installed at an enterprise. In some other cases, the server 405 may receive data inputs from multiple internal systems, such as different departments, silos, or business functions of an enterprise. In some cases, the server 405 and user device 415 may be configured to communicate over a communication link 420, which may be an example of a wired or wireless communication link (e.g., Wi-Fi, mobile or cellular communications, such as 3G, 4G, 5G, etc.).

Generally, the server 405 receives a large amount of data (i.e., the data universe) as input, then chooses aspects of the data to progressively filter until it arrives at smaller subsets. In some cases, a data subset may be described by a vector, where additional dimensions may be added to the vector as additional subsets are analyzed (i.e., drilling into data). As an example, and with reference to clothing sales at a department store, a merchant may choose to divide sales data by the department (e.g., men's, women's, children, etc.). In this case, [Department, Color] may be an example of a vector, with the coordinates of a subset being [Women's, Red]. It should be noted that, in this example, the data subset may be directed to the sales for red colored clothes from the women's department. Further, a data pattern may include the associated statistics for that data subset.

In some cases, the server 405 may be configured to not only discover the myriad sub-groups of data that are interesting (e.g., comprise notable characteristics) within a larger data set, but also display the relationships between different sub-groups or subsets of the data set via graphs, such as directed acyclic graphs (DAGs) displayed on the user device 415. In some aspects, displaying relationships in a manner described in this disclosure may provide users with crucial insight for making business decisions.

Aspects of the present disclosure may also relate to optimization of DAGs displayed to a user. In one example, if the data associated with input dataset 410 is divided along 10 dimensions with 20 values for each dimension, the number of patterns that could derived from the input dataset 410 may be on the order of 2110, which is roughly 16 trillion patterns. Calculating and fully populating 16 trillion patterns may not only be time consuming and computationally expensive, but also unfeasible in most situations. According to the present disclosure, the system 400 may be configured to discover a subset of patterns of interest from the input dataset 410, and then selectively calculate and display the parents (and other ancestors) according to a heuristic without fully populating the DAG, thus making it feasible for a human user to comprehend the DAG. As an example, if a pattern is defined by 5 filters matching (A, B, C, D, E), the system 400 may populate a plurality of parents with one filter removed (e.g., [A, B, C, D], [A, C, D, E], etc.), giving 5 unique combinations, as well as the one-filter versions (e.g., [A] alone, [B] alone, etc.), also giving 5 unique combinations. In this way, the system 400 may be configured to display only a portion of relevant patterns in the DAG, instead of all of the possible patterns.

FIGS. 5-11 illustrate exemplary interactive user interfaces 500-1100 used in conjunction with the various embodiments described herein. In some cases, user interfaces 500-1100 may implement one or more aspects of systems 100 and/or 400 described in relation to FIGS. 1 and 4, as well as other figures described herein. Further, user interfaces 500-1100 may be interactive, and adapted to receive user input actions via an input device, such as a mouse, keyboard, camera, microphone, etc. In some cases, user input actions may include clicking on a subset, commenting on a subset, favoriting a subset, etc.

Figure 5:
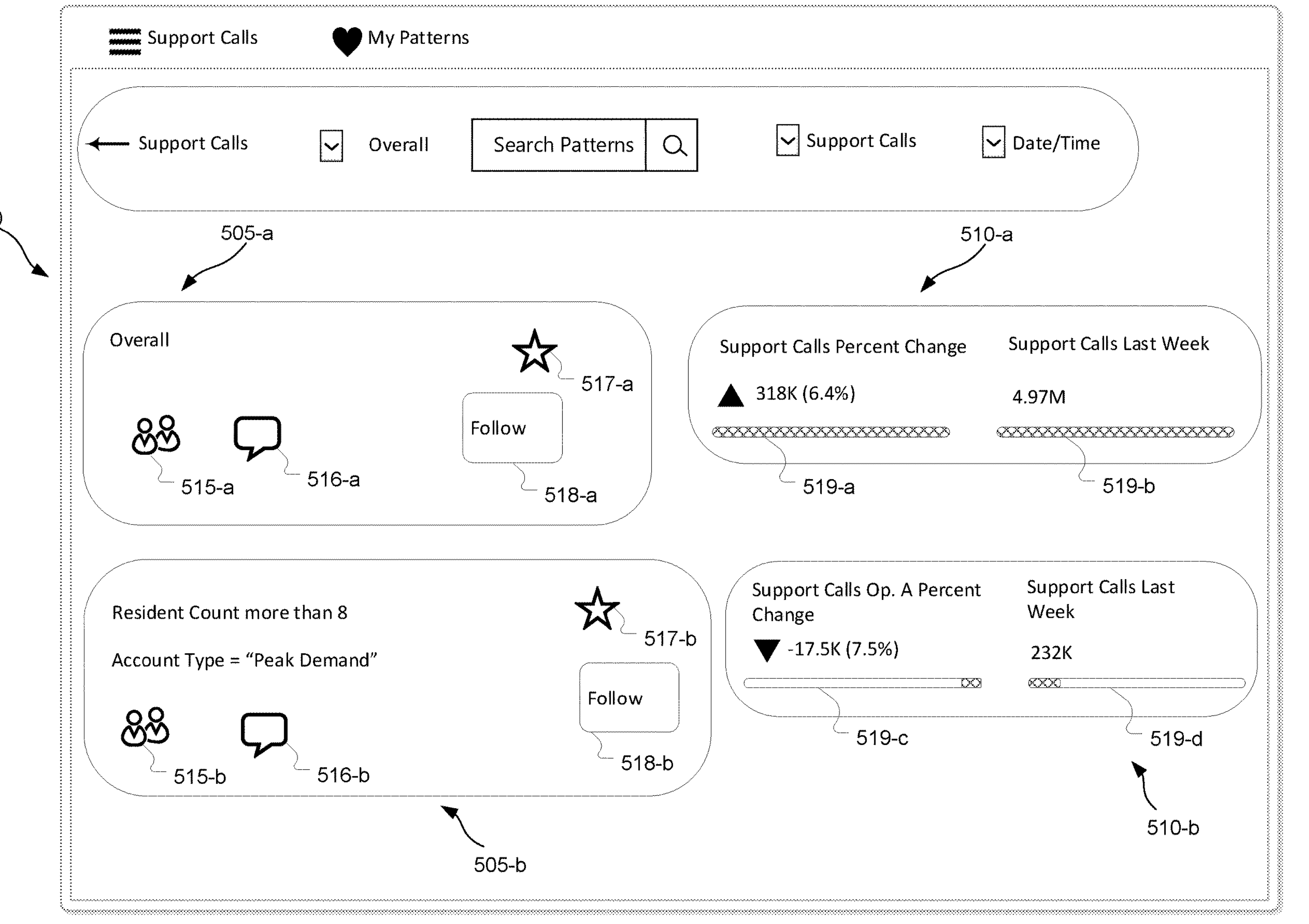
FIGS. 5-11 illustrate exemplary screen shots of a user interface designed to implement various aspects as disclosed herein.
Figure 6:
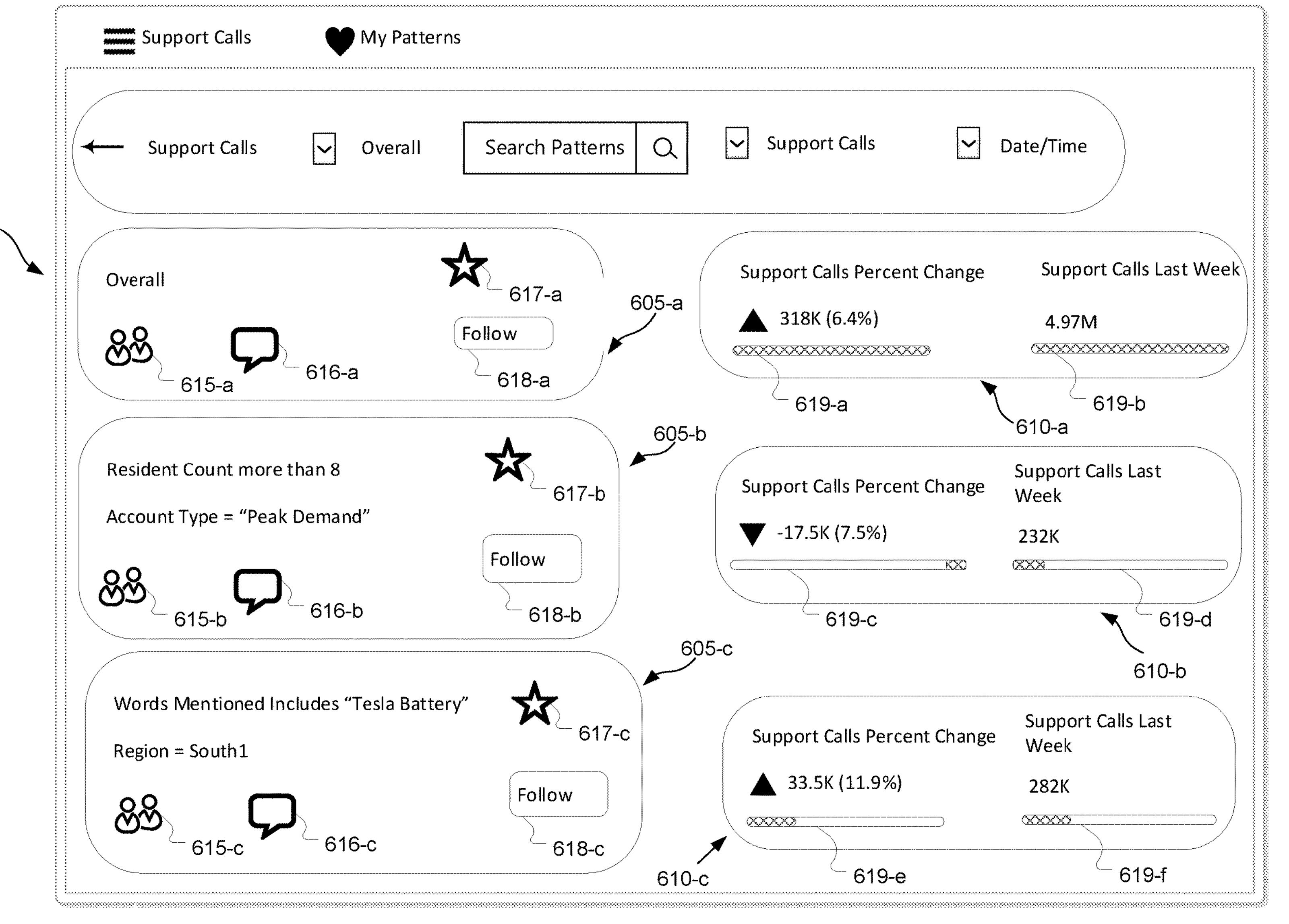
Figure 7:
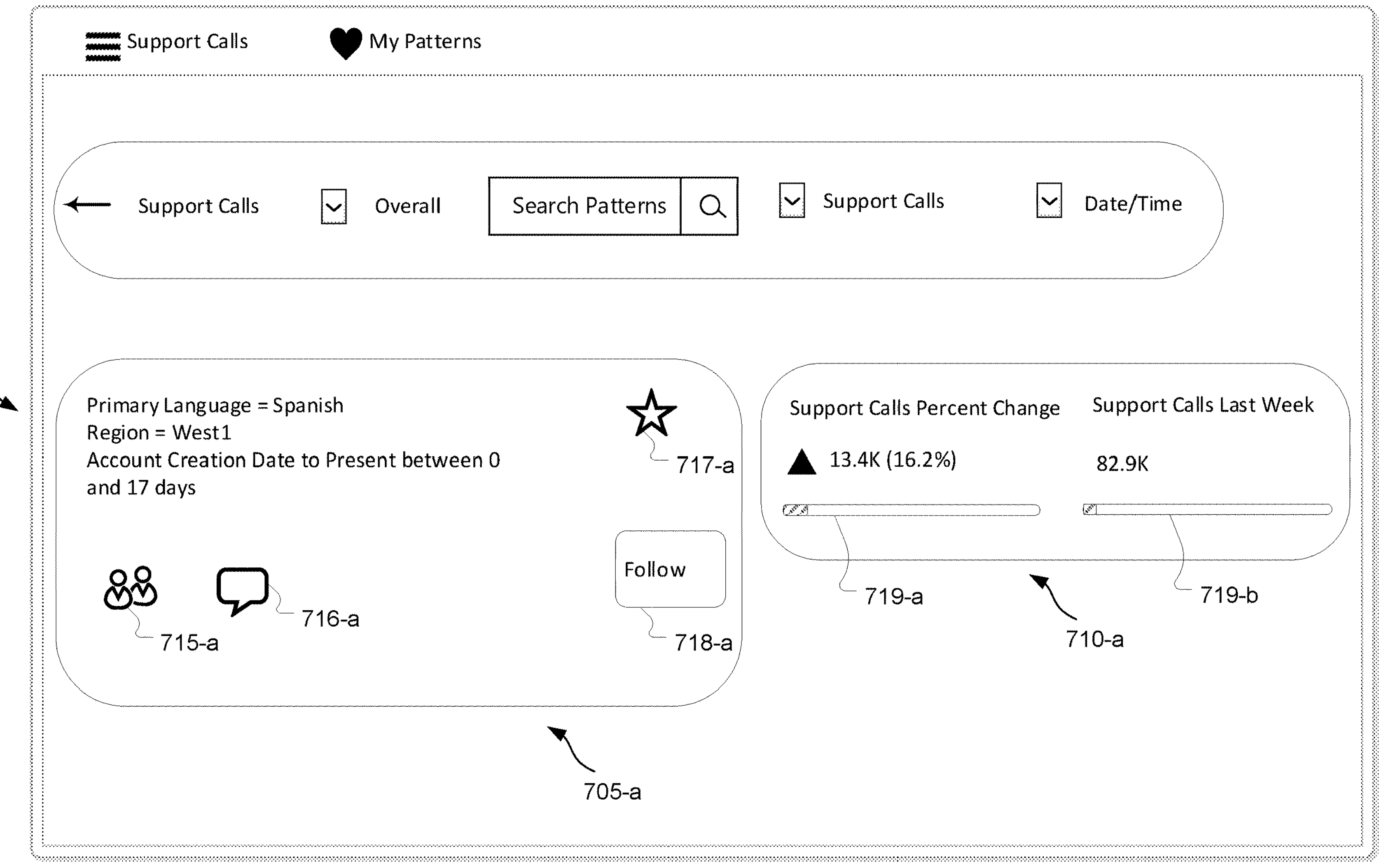

FIGS. 5-7 illustrate user interfaces 500-700, respectively. In some embodiments, user interfaces 500-700 may be examples of a main user interface displayed to users. As illustrated in FIG. 5, user interface 500, also referred to as UI 500, may display an overall listing 505-*a* for support calls. Further, UI 500 may display one or more statistics 510-*a* related to the overall listing 505-*a*

In some embodiments, UI 500 further displays a listing 505-*b* directed to one of many different data subsets and/or data patterns from the support calls dataset, where the subset shown in listing 505-*b* may be an example of a child subset of the subset shown in listing 505-*a*. In some embodiments, the support calls dataset may be associated with the overall listing 505-*a* for support calls. As previously described, in some examples, a data subset may be defined by one or more filters. For instance, the subset in listing 505-*b* may be defined by the filters [Resident Count more than 8, Account Type="Peak Demand"].

As further shown in FIG. 5, the UI 500 may display statistics 510-*b* associated with the listing 505-*b*. In some cases, statistics 510-*a* and 510-*b* may be examples of data patterns, previously described above. In some cases, overall listing 505 may display one or more buttons, such as user buttons 515-*a* and 515-*b* (e.g., for assigning the subset or a statistic of the subset to a given user, viewing list of users that have accessed the subset, etc.), comment buttons 516-*a* and 516-*b* (e.g., for adding a comment pertaining to the subset), favorite buttons 517-*a* and 517-*b* (e.g., for adding the subset to a favorites list), and follow buttons 518-*a* and 518-*b* (e.g., for following the subset and/or subsets related to it). In some embodiments, UI 500 may also display progress bars 519 (e.g., progress bars 519-*a*, 519-*b*, 519-*c*, 519-*d*) along with the one or more statistics 510, where the progress bars 519 may be used to depict, in a graphical form, the statistics pertaining to different data subsets as a fraction of the statistics for the input dataset.

Turning now to FIG. 6, UI 600 may be used to display an overall listing 605-*a* and one or more statistics 610-*a* associated with the overall listing 605-*a*. In some embodiments, the overall listing 605-*a* and statistics 610-*a* may be the same as or similar to overall listing 505-*a* and statistics 510-*a* described in relation to FIG. 5. In some embodiments, the UI 600 may further display listing 605-*b* and statistics 610-*b* associated with the listing 605-*b*. In some embodiments, the overall listing 605-*b* and statistics 610-*b* may be the same as or similar to overall listing 505-*b* and statistics 510-*b*, respectively, as described above in relation to FIG. 5. As shown, the UI 600 may also display a listing 605-*c* and associated statistics 610-*c*. In some embodiments, listing 605-*b* and 605-*c* may be associated with different data patterns derived or generated from an input dataset directed to support calls, and may be defined by different sets of filters. As shown, listings 605-*b* and 605-*c* may be defined by a first set of filters [Resident Count>8, Account Type="Peak Demand"] and a second set of filters [Words=Tesla Battery, Region=South 1], respectively. In this way, UI 600 may be used to compare data sets and/or subsets through the decomposition of the relationship between an input data set and its children subsets into a DAG, where the children subsets may be defined using different filters.

Similar to FIG. 5, in some cases, overall listing 605-*a* may display one or more buttons, such as user buttons 615-*a*, 615-*b*, and 615-*c* (e.g., for assigning the subset or a statistic of the subset to a given user, viewing list of users that have accessed the subset, etc.), comment buttons 616-*a*, 616-*b*, and 616-*c* (e.g., for adding a comment pertaining to the subset), favorite buttons 617-*a*, 617-*b*, and 617-*c* (e.g., for adding the subset to a favorites list), follow buttons 618-*a*, 618-*b*, and 618-*c* (e.g., for following the subset and/or subsets related to it).

Further, UI 600 may display one or more statistics 610 related to the listings 605. In some embodiments, UI 600 may also display progress bars 619 (e.g., progress bars 619-*a*, 619-*b*, 619-*c*, 619-*d*, 619-*c*, and 619-*f*) along with the one or more statistics 610, where the progress bars 619 may be used to depict, in a graphical form, the statistics pertaining to different data subsets as a fraction of the statistics for the input dataset.

Turning now to FIG. 7, UI 700 may be used to display another listing 705-*a* showing a subset defined by a set of filters [Primary Language=Spanish, Region=West 1, Account Creation Date to Present between 0 and 17 days]. In some cases, UI 700 may also display statistics 710-*a* associated with the listing 705-*a*, including a percentage change in support calls as compared to the previous week, as well as the number of support calls last week. In some cases, the subset shown under listing 705-*a*, and the subsets shown under listings 605-*b* and 605-*c* of FIG. 6 may be examples of non-adjacent subsets, since they comprise no common coordinates (i.e., defined using a different set of filters).

As shown, and similar to FIGS. 5 and 6, listing 705-*a* may display one or more buttons, such as user button 715-*a* (e.g., for assigning the subset or a statistic of the subset to a given user, viewing list of users that have accessed the subset, etc.), comment button 716-*a* (e.g., for adding a comment pertaining to the subset), favorite button 717-*a* (e.g., for adding the subset to a favorites list), and follow button 718-*a* (e.g., for following the subset and/or other subsets related to it).

Further, UI 700 may display one or more statistics 710 related to the listing 705. In some embodiments, UI 700 may also display progress bars 719-*a* and 719-*b* along with the one or more statistics 710, where the progress bars 719 may be used to depict, in a graphical form, the statistics pertaining to different data subsets as a fraction of the statistics for the input dataset.

Figure 8:
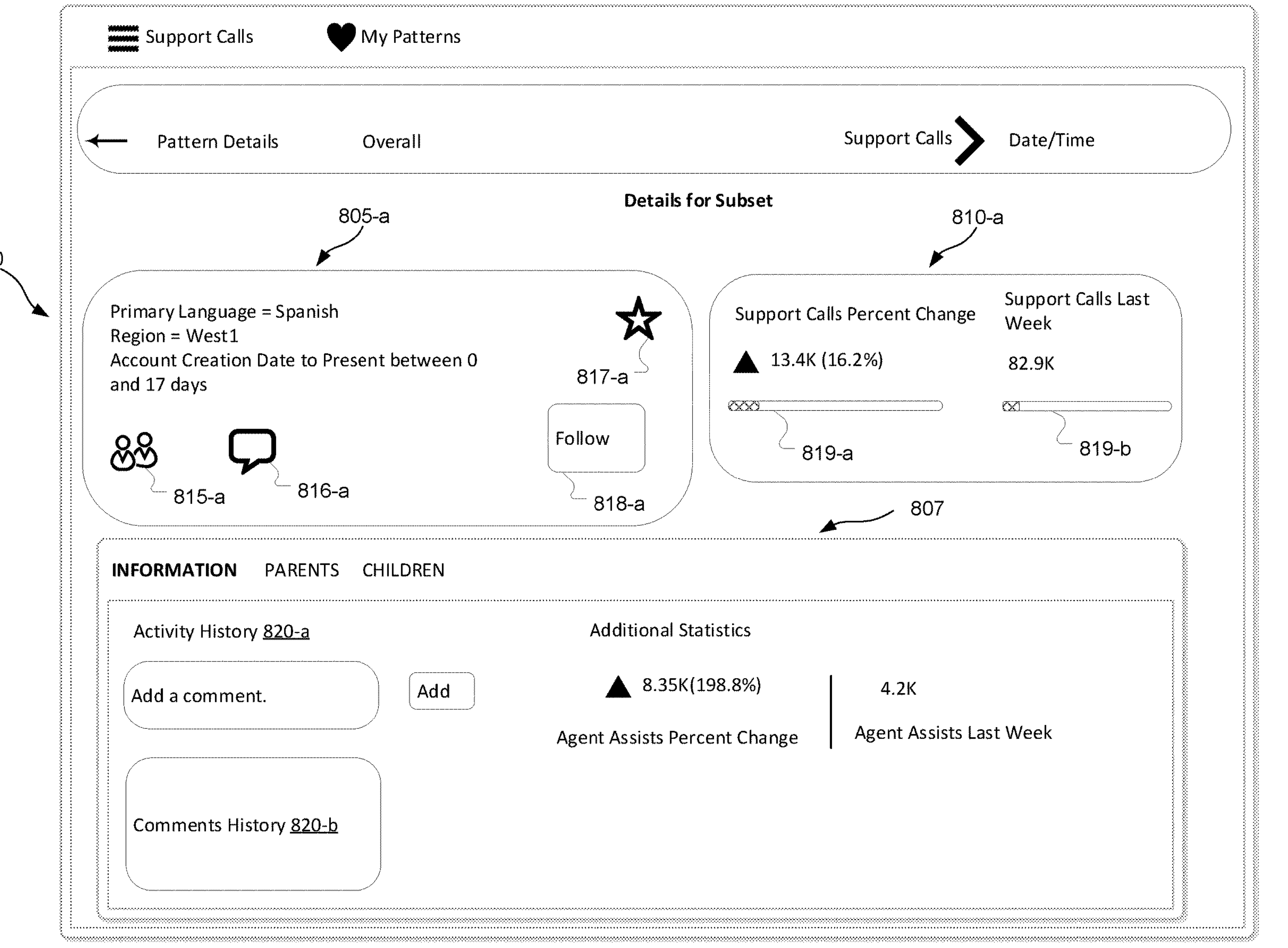

FIGS. 8-11 illustrate detailed interface sections that focus in on a single subset of an input dataset. As shown in FIG. 8, UI 800 displays the details for the subset defined by a first set of filters [Primary Language=Spanish, Region=West1, Account Creation Date to Present between 0 and 17 days] in listing 805-*a*. In some cases, UI 800 may also display statistics 810-*a*, which may be an example of a data pattern, corresponding to the listing 805-*a*. UI 800 may implement one or more aspects of the figures described herein.

As shown, listing 805-*a* may display one or more buttons, such as user button 815-*a* (e.g., for assigning the subset or a statistic of the subset to a given user, viewing list of users that have accessed the subset, etc.), comment button 816-*a* (e.g., for adding a comment pertaining to the subset), favorite button 817-*a* (e.g., for adding the subset to a favorites list), and follow button 818-*a* (e.g., for following the subset and/or subsets related to it).

Further, UI 800 may display one or more statistics 810 related to the listing 805. In some embodiments, UI 800 may also display progress bars 819-*a* and 819-*b* along with the one or more statistics 810, where the progress bars 819 may be used to depict, in a graphical form, the statistics pertaining to different data subsets as a fraction of the statistics for the input dataset (i.e., shown in overall listings 505-*a* and 605-*a* in FIGS. 5 and 6, respectively).

In some embodiments, after a user selects to view the details for a data pattern, UI 800 may display section 807 via the user interface. As shown, section 807 may comprise multiple tabs (e.g., Information, Parents, Children, etc.). Under the Information tab, UI 800 may display additional statistics related to the subset in listing 805-*a*, activity history 820-*a*, comments history 820-*b*, etc. The UI 800 may also allow a user to add comments pertaining to the pattern and/or subset. In some circumstances, the system (e.g., system 100, 400, etc.) may utilize one or more of the activity history 820-*a*, comments history 820-*b*, etc., as heuristics input, further described in relation to FIGS. 12-14.

Figure 9:
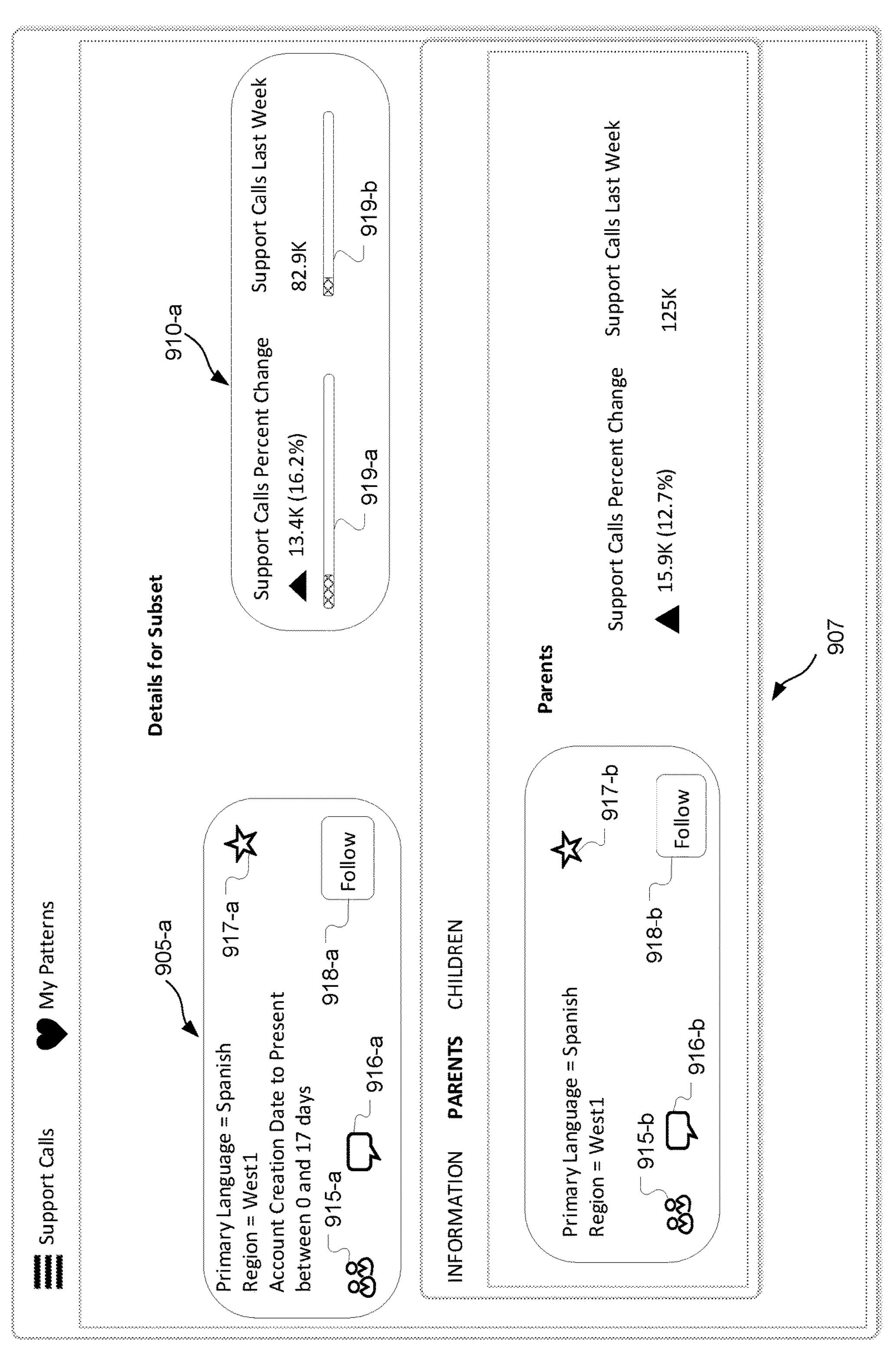

FIG. 9 illustrates a UI 900 according to an embodiment of the disclosure. In some examples, UI 900 depicts a detailed interactive user interface focused on a single subset of an input dataset. UI 900 may implement one or more aspects of UI 800 described in relation to FIG. 8, or any other figure described herein. As shown, UI 900 displays the details for a first data subset defined by a first set of filters [Primary Language=Spanish, Region=West1, Account Creation Date to Present between 0 and 17 days] in listing 905-*a*. In some cases, UI 900 may also display statistics 910-*a* associated with the first data subset in listing 905-*a*. It should be noted that statistics 910-*a* may be an example of a data pattern.

In some cases, listing 905-*a* may display one or more buttons, such as user button 915-*a*, comment button 916-*a*, favorite button 917-*a*, and follow button 918-*a*, which may be examples of the user button 515-*a*, comment button 516-*a*, favorite button 517-*a*, and follow button 518-*a*, respectively, as described in relation to FIG. 5. In some embodiments, UI 900 may also display progress bars 919 (e.g., progress bars 919-*a* and 919-*b*) along with the one or more statistics 910-*a*, where the progress bars 919 may be used to depict, in graphical form, the statistics pertaining to the subset.

In some embodiments, after a user selects to view the details for a particular pattern or subset, UI 900 may be used to display section 907, which may be the same as or similar to section 807 in FIG. 8. Similar to section 807, section 907 may be displayed to the user via a user interface, and may comprise multiple tabs (e.g., Information, Parents, Children, etc.). In some cases, the Parents tab may display information pertaining to one or more additional subsets comprising notable characteristics, where the one or more additional subsets contain the first data subset shown in listing 905-*a*. In other words, the system may be adapted to identity one or more parent sets, where each parent set (e.g., subset defined by filters [Primary Language=Spanish, Region=West 1] is a subset of the input data set and a superset of the first data subset, and display the one or more parent sets via the user interface. In some aspects, the Parents section may be akin to going up the structure of a Directed Acyclic Graph (DAG), since each parent set of the one or more parent sets may be defined by a subset of the first set of filters that define the first data subset (i.e., filter [Primary Language=Spanish, Region=West 1] is a subset of filter [Primary Language=Spanish, Region=West1, Account Creation Date to Present between 0 and 17 days]).

As previously described, a DAG may refer to a finite directed graph with no directed cycles. In some cases, DAGs may be used to be model probabilities, connectivity, and/or causality. In some cases, section 907 may also display one or more buttons, such as user button 915-*b*, comment button 916-*b*, favorite button 917-*b*, and follow button 918-*b*, which may be examples of the user button 915-*a*, comment button 916-*a*, favorite button 917-*a*, and follow button 918-*a*, respectively, as described above.

Figure 10:
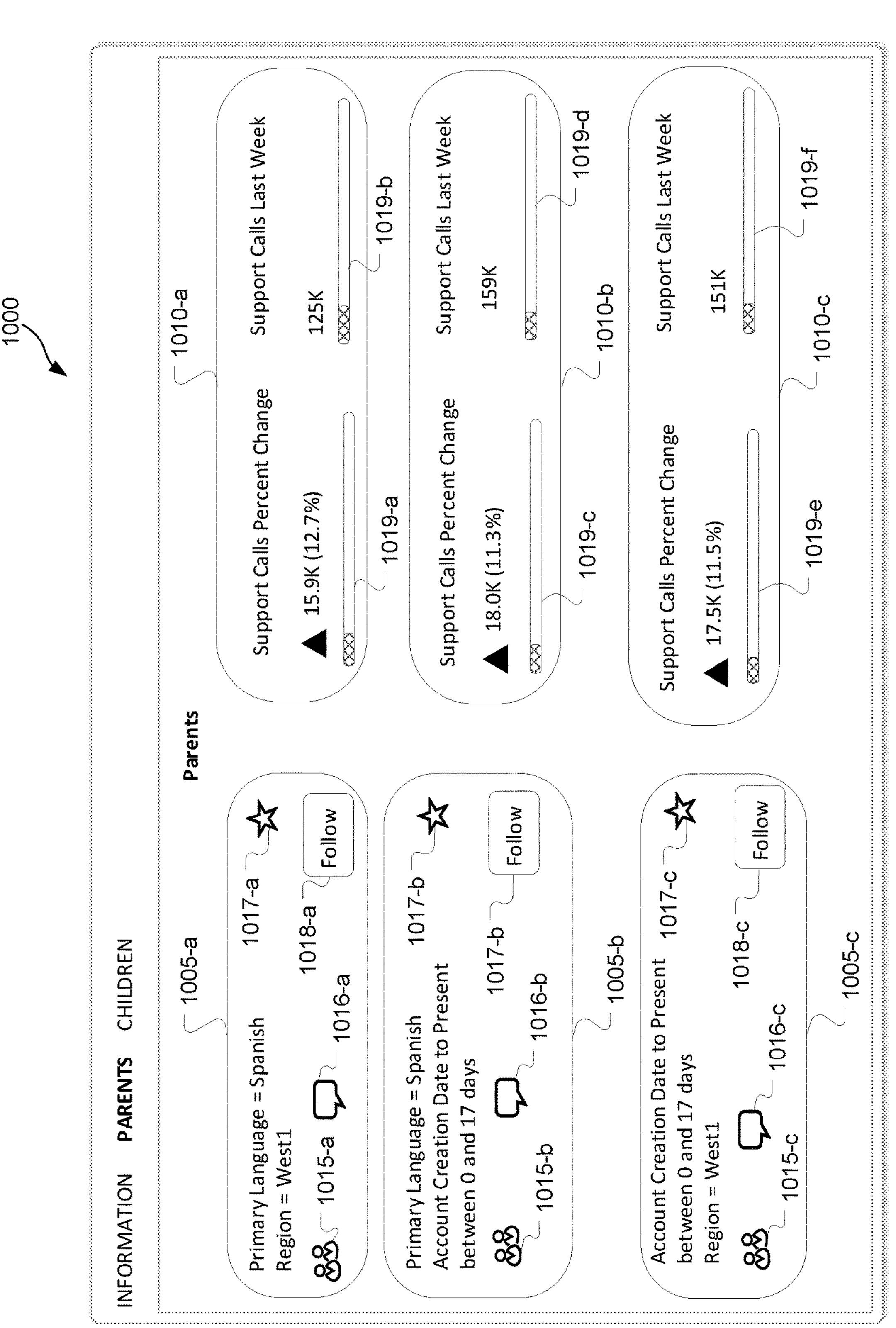

Turning now to FIG. 10, which is an example of a detailed interface section focusing on the single subset previously seen in FIG. 9. In particular, FIG. 10 illustrates UI 1000 which may be used to display one or more parent subsets of a child subset. In this example, the subsets defined by the filters [Primary Language=Spanish, Region=West 1], [Primary Language=Spanish, Account Creation Date to Present between 0 and 17 days], and [Account Creation Date to Present between 0 and 17 days, Region=West1] shown in listings 1005-*a*, 1005-*b*, and 1005-*c*, respectively, may be parent sets of the subset defined by filters [Primary Language=Spanish, Region=West1, Account Creation Date to Present between 0 and 17 days]. Said another way, the subset defined by filters [Primary Language=Spanish, Region=West1, Account Creation Date to Present between 0 and 17 days] may be a child of the subsets shown in listings 1005-*a*, 1005-*b*, and 1005-*c*.

In some examples, the UI 1000 may also display one or more statistics associated with the parent subsets, including statistics 1010-*a*, 1010-*b*, and 1010-*c*. In some cases, statistics 1010 may be examples of data patterns.

Similar to the figures above, in some cases, listings 1005 may display one or more buttons, such as user buttons 1015-*a*, 1015-*b*, and 1015-*c* (e.g., for assigning the subset or a statistic of the subset to a given user, viewing list of users that have accessed the subset, etc.), comment buttons 1016-*a*, 1016-*b*, and 1016-*c* (e.g., for adding a comment pertaining to the subset), favorite buttons 1017-*a*, 1017-*b*, and 1017-*c* (e.g., for adding the subset to a favorites list), follow buttons 1018-*a*, 1018-*b*, and 1018-*c* (e.g., for following the subset and/or subsets related to it).

Further, UI 1000 may display one or more statistics 1010 related to the listings 1005. In some embodiments, UI 1000 may also display progress bars 1019 (e.g., progress bars 1019-*a*, 1019-*b*, 1019-*c*, 1019-*d*, 1019-*c*, and 1019-*f*) along with the one or more statistics 1010, where the progress bars 1019 may be used to depict, in graphical form, the statistics pertaining to different data subsets as a fraction of the statistics for an input dataset.

Figure 11:
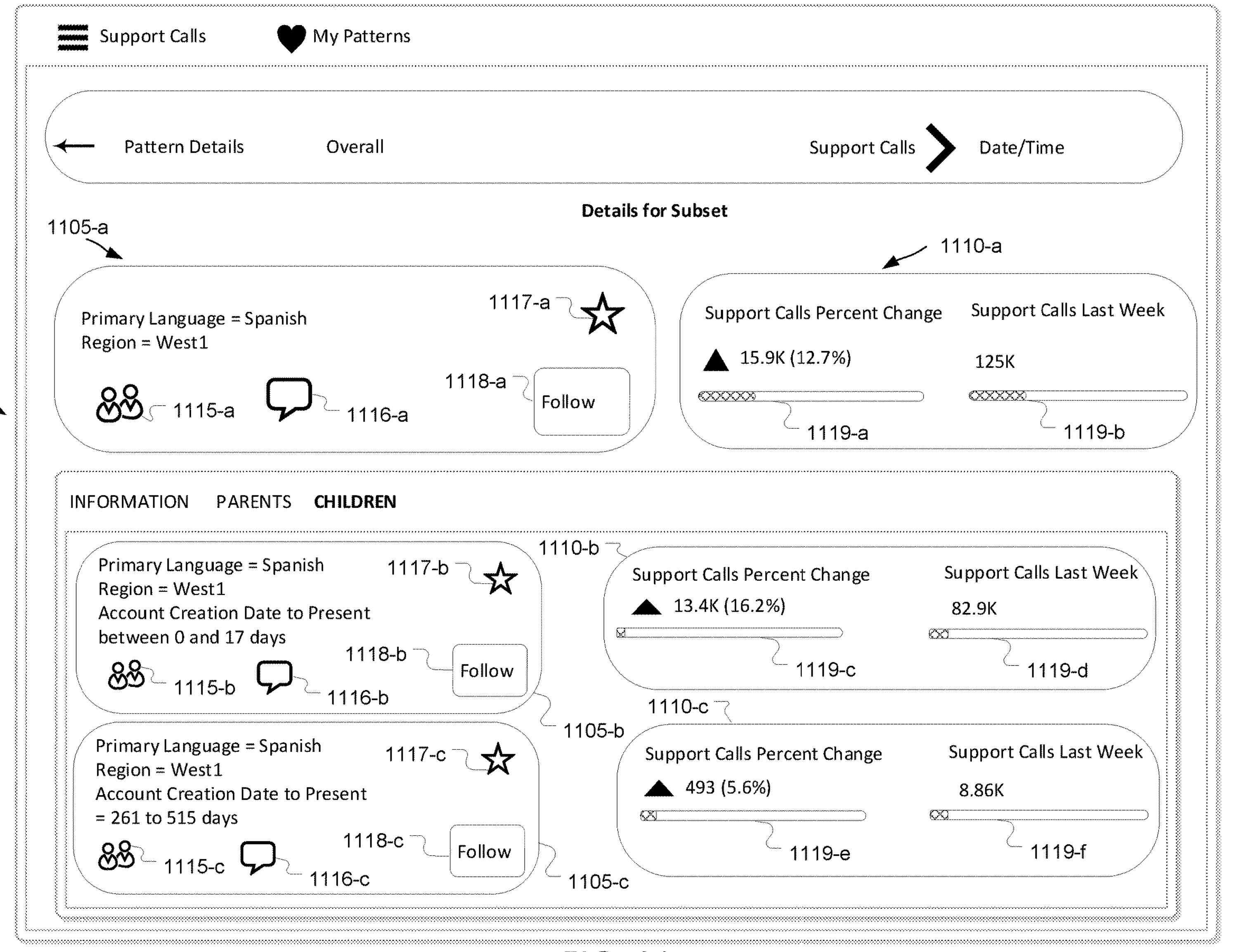

FIG. 11 is an example of a detailed interface section focusing on one or more subsets previously discussed in relation to FIGS. 8, 9 and 10. In particular, FIG. 11 illustrates UI 1100 which may be used to display the children of a subset defined by a set of filters [Primary Language=Spanish, Region=West 1] shown in listing 1105-*a*. The UI 1100 may further display one or more statistics 1110-*a*, or a data pattern, associated with the subset. In some embodiments, the UI 1100 may implement one or more aspects of UIs 800-1000 as described in relation to FIGS. 8-10, or any other figure described herein. In some cases, listing 1105-*a* may display one or more buttons, such as user button 1115-*a*, comment button 1116-*a*, favorite button 1117-*a*, and follow button 1118-*a*, which may be examples of the user button 515-*a*, comment button 516-*a*, favorite button 517-*a*, and follow button 518-*a*, respectively, as described in relation to FIG. 5. In some embodiments, UI 1100 may also display progress bars 1119 (e.g., progress bars 1119-*a* and 1119-*b*) along with the one or more statistics 1110-*a*, where the progress bars 1119 may be examples of the progress bars 519 shown in FIG. 5.

In some embodiments, under the Children tab, UI 1100 may display a first subset defined by a first set of filters [Primary Language=Spanish, Region=West 1, Account Creation Date to Present between 0 and 17 days] in listing 1105-*b*. In some cases, the first subset may be a child of the subset defined by a subset of the first set of filters [Primary Language=Spanish, Region=West 1] shown in listing 1105-*a*, since the first subset shares two of its three filters (or coordinates) with the parent subset (i.e., [Primary Language=Spanish, Region=West1]).

Additionally or alternatively, UI 1100 may also display a second subset in listing 1105-*c*, where the second subset may be defined using a set of filters [Primary Language=Spanish, Region=West 1, Account Creation Date to Present between 261 to 515 days]. The second subset may also be an example of a child subset of the subset in listing 1105-*a*. In some examples, UI 1100 may display one or more statistics 1110-*b* and 1110-*c*, also known as data patterns, associated with the first and second subsets 1105-*b* and 1105-*c*, respectively.

For instance, the Children tab may also display one or more buttons, such as user buttons 1115-*b* and 1115-*c*, comment buttons 1116-*b* and 1116-*c*, favorite buttons 1117-*b* and 1117-*c*, and follow buttons 1118-*b* and 1118-*c*, which may be examples of the user button 515-*a*, comment button 516-*a*, favorite button 517-*a*, and follow button 518-*a*, respectively, as described above in relation to FIG. 5. In some embodiments, UI 1100 may also display progress bars 1119 (e.g., progress bars 1119-*c*, 1119-*d*, 1119-*c*, 1119-*f*) along with the one or more statistics 1110-*b* and 1110-*c*, where the progress bars 1119 may be examples of the progress bars 519 shown in FIG. 5.

In some aspects, the information displayed in the Children section is akin to drilling down in subsets that are children of the current subset (i.e., subset shown in listing 1105-*a*) in the Directed Acyclic Graph (DAG). In other words, one or more filters, dimensions, or coordinates may be added to the subset defined by the filters [Primary Language=Spanish, Region=West1] to generate additional subsets, including the first and second subsets shown in listings 1105-*b* and 1105-*c*, respectively. Further, the additional subsets generated may be children of the subset shown in listing 1105-*a*. In some cases, the system of the present disclosure may be adapted to display a DAG showing the relationships between an input data set and its descendant subsets, as well as the filters used to define the various descendant subsets.

Figure 12:
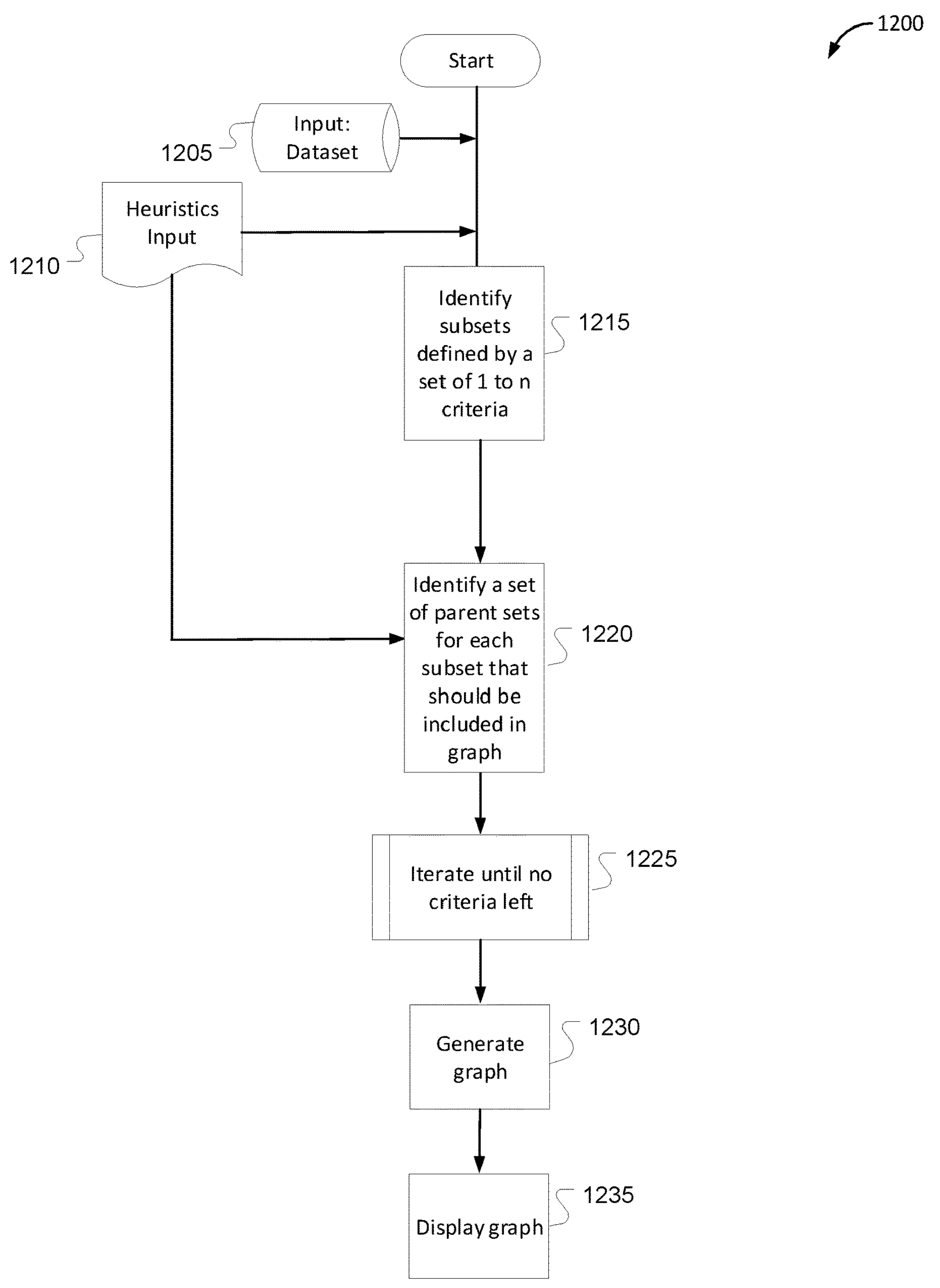
FIG. 12 illustrates a process flow in accordance with one or more implementations.

FIG. 12 illustrates a system level process flow 1200 that depicts various aspects of the embodiments described and claimed herein. In some cases, process flow 1200 may implement one or more aspects of systems 100 and/or 400 as described in relation to FIGS. 1 and 4, respectively. Further, process flow 1200 may be directed to a Sparse DAG method in accordance with one or more implementations. As shown, process flow 1200 may include input dataset 1205. Process flow 1200 may optionally include heuristics input 1210, which may be used for decision making. In some cases, heuristics input 1210 may include one or more of Key Performance Indicators (KPIs), user behavior information, and hyperparameters, to name a few non-limiting examples.

At 1215, the system may identify one or more subsets comprising notable characteristics, which may also be referred to as "interesting subsets" for the purposes of this disclosure. Each subset of the list of interesting subsets may be defined by a set of 1 to N (e.g., 3, 4, 6, etc.) filters, as described above. Some examples of filters may include a cell equaling a value, a cell containing a given value, a cell being in a given range, a cell mapping to another value being explored (e.g. a date may be used to derive if a given day falls on a weekend or a weekday, where the filter is weekday), etc., to name a few non-limiting examples.

In some embodiments, a data pattern may be associated with a subset of the input data set. Further, the system may utilize unsupervised machine learning techniques for finding candidate subsets and their associated patterns. In some other cases, the system may utilize one or more of supervised machine learning and semi-supervised machine learning for identifying the one or more subsets at 1215. It should be noted that, the system may be configured to use any or all of the different machine learning techniques while identifying subsets. Additionally or alternatively, the system may also utilize feedback from operators or users regarding preferred columns upon which to divide data. As an example, in some settings, it may be more intuitive for a user or operator to act on price-related patterns. Accordingly, the user or operator may indicate price as a preferred column for dividing data. In such cases, the system may include price as one of the columns while identifying subsets. As noted above, a pattern may be defined as the statistics associated with a subset of data.

Additionally or alternatively, the system may utilize a set of metrics to identify the one or more subsets. In some examples, the system may assign a score related to how notable a data pattern is with respect to other patterns. As an example, if an average value for a first subset of data is 20% higher than the average value for an input data set, it may be classified as notable (or not) depending on the number of other subsets that have higher average values. For instance, if 200 other subsets of the input data set comprise average values that are at least 50% higher than the input data set, the first subset may not be classified as comprising a notable characteristic.

In some embodiments, the set of metrics may be provided by a human user of the system, such as a data analyst, manager, sales representative, etc. In other cases, the set of metrics may be provided via an artificial intelligence or machine learning algorithm. In some cases, the set of metrics may comprise one or more business metrics, such as campaign and program statistics, which may be examples of marketing and social media metrics, or new opportunities and leads, which may be examples of sales performance metrics, or financial metrics, to name a few non-limiting examples. Additionally or alternatively, metrics may also include one or more of web traffic sources, incremental sales, social sentiment, sales growth, average profit margin, average purchase value, product performance, etc.

In some embodiments, at 1220, the system may identify a set of parent sets for each subset. In some cases, the subsets identified at 1215 may be defined by multiple filters (e.g., a subset may be defined by 5 filters matching [A, B, C, D, E], and may be referred to as subset (ABCDE)). Further, the subset (ABCDE) may include one or more parent sets, where the parent sets comprise a subset of the filters used to define the subset (ABCDE). As an example, the sets defined by filter(s) [A], [B], [C], [D], [E], [A, B, C, D], [A, C, D, E], [B, C, D, E] and so on, may all be examples of parent sets of the subset defined by the filters [A, B, C, D, E]. The set defined by the filter [A] may be an example of a single-filter subset. Further, sets defined by the filters [A, B, C] and [A, B, C, D] include 3 and 4 filters, respectively.

At 1225, the system may iterate upwards (e.g., decrease the number of filters used to define parent sets) until one or more parent sets has been identified for each subset.

At 1230, the system may generate a graph, such as a directed acyclic graph (DAG) based in part on the subsets identified at 1215 and the set of parent sets for each subset identified at 1220. It should be noted that, in some circumstances, one or more parent sets of different subsets may overlap. In some embodiments, the system may be configured to display, via a user interface, the generated DAG to the user on a user device. For instance, the system may provide, via an interactive user interface on a visual display, the directed acyclic graph to a user, where the interactive user interface comprises one or more data visualizations for the DAG. Additionally, in some cases, the interactive user interface may be configured to accept a user input action based on identifying a user interaction with the DAG.

Thus, in some aspects, the system of the present disclosure may be adapted to not only discover data subsets that may be of interest from an input data set, but also selectively calculate and display their parents (and other ancestors), as well as children, according to a heuristics input.

Figure 13:
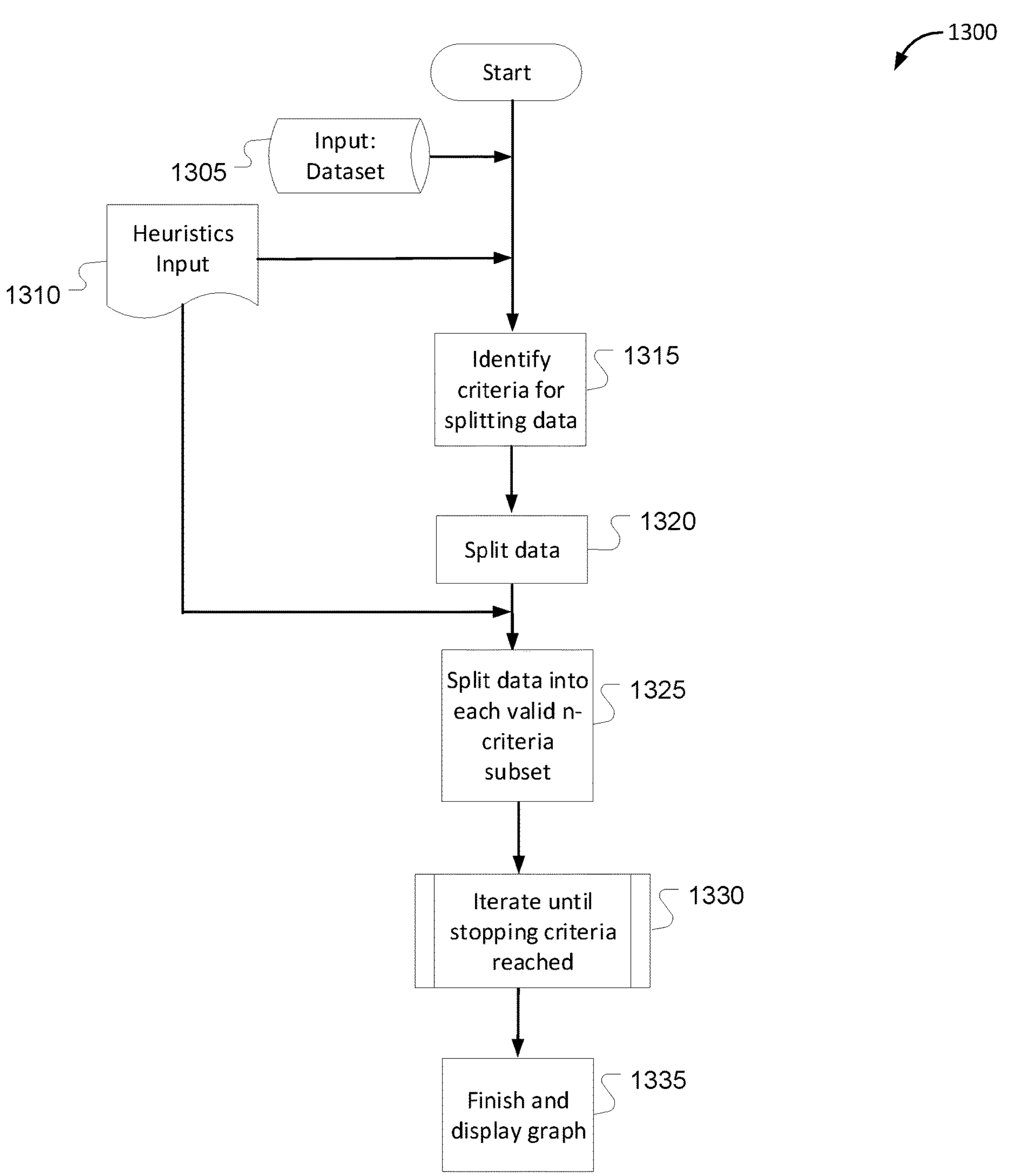
FIG. 13 illustrates a process flow according to an alternate embodiment of the disclosure.

FIG. 13 illustrates a system level process flow 1300 that depicts various aspects of the embodiments described and claimed herein. In some cases, process flow 1300 may implement one or more aspects of systems 100 and/or 400 as described in relation to FIGS. 1 and 4, respectively, and other figures described herein. Further, process flow 1300 may be directed to a Dense DAG method in accordance with one or more implementations. As shown, process flow 1300 may include input dataset 1305. Process flow 1300 may optionally include heuristics input 1310, which may be used for decision making. Input dataset 1305 and heuristics input 1310 may be examples of the input dataset 1205 and heuristics input 1210, respectively, as described above in relation to FIG. 12. In some cases, heuristics input 1310 may include one or more of KPIs, user behavior information, and hyperparameters, to name a few non-limiting examples.

At 1315, the system may identify one or more criteria (e.g., a first set of N criteria) for splitting data associated with the input dataset. Further, at 1320, the system may split the data on each criteria into subsets, each defined by one filter. For instance, the system may split data associated with the first set of criteria into a subset associated with a first criteria of the first set of criteria, wherein the subset associated with the first criteria is defined by a first filter of the set of filters. In some examples, the system may split the data, which may be associated with the first criteria, into a plurality of subsets defined by the first set of filters, where each subset may be defined by a single-filter from the first set of filters. For instance, the system may split data associated with the first criteria into a subset defined by a first filter of the first set of filters.

In some examples, at 1325, the system may further generate a plurality of subsets by splitting data associated with the first criteria into further subsets defined by one or more subsequent filters (i.e., of the first set of filters) and at least a single filter (e.g., the first filter) from 1320. In some circumstances, the plurality of subsets at 1325 may be generated by splitting data associated with the first set of criteria into valid N-filter subsets, where the subsets are defined using different layers based on the number of filters used to define a respective subset. In some cases, the number of filters used to define a subset may be 1 higher than for the previous layer. Further, each subset may have at least N parents in a directed acyclic graph.

As an example, if a first criteria for splitting data at 1315 includes average price, and subsets may be defined by 5 filters, namely [A], [B], [C], [D], and [E], the system may split data associated with the first criteria into 5 subsets defined by [A], [B], [C], [D], and [E] at 1320. Further, at 1325, the system may generate a plurality of subsets by splitting data associated with the first criteria into subsets defined using the single filter [A]. For instance, the system may generate a 2-filter subset (e.g., a subset defined by filters [A, B]), a 3-filter subset (e.g., a subset defined by filters [A, B, C]), and so on. In this example, the system may also generate subsets by splitting data associated with the first criteria into subsets defined by filters [B], [C], [D], and [E], where each single-filter subset may be used to generate one or more additional subsets at each layer. Thus, each layer may comprise subsets defined by a different number of criteria.

In some cases, at 1330, the system may continue splitting the data associated with the first criteria (or another criteria from the first set of criteria) into further subsets defined by a subsequent filter until a termination or stopping condition is reached. For instance, once the system generates a subset defined by filters [A, B, C, D, E] for the last layer (N=5), the system may terminate producing additional subsets. In some cases, a subset of an $N^{th}$ layer may comprise N parent sets in the DAG. For instance, a subset of the $2^{nd}$ layer defined by filters [A, B] may comprise two parents, one defined by filter [A], and the other defined by filter [B]. Additionally or alternatively, the system may iterate producing subsets until a stopping criteria is reached. Some non-exhaustive examples of stopping criteria may include a total DAG size, or a minimum subset size.

In some cases, once a stopping criterion has been reached, the system may finish generating a graph (e.g., a DAG) for display to the user at 1335. The DAG may be displayed to the user via a user interface on a user device, such as a laptop, a computer, a mobile device (e.g., cell phone, tablet, Netbook), etc.

Figure 14:
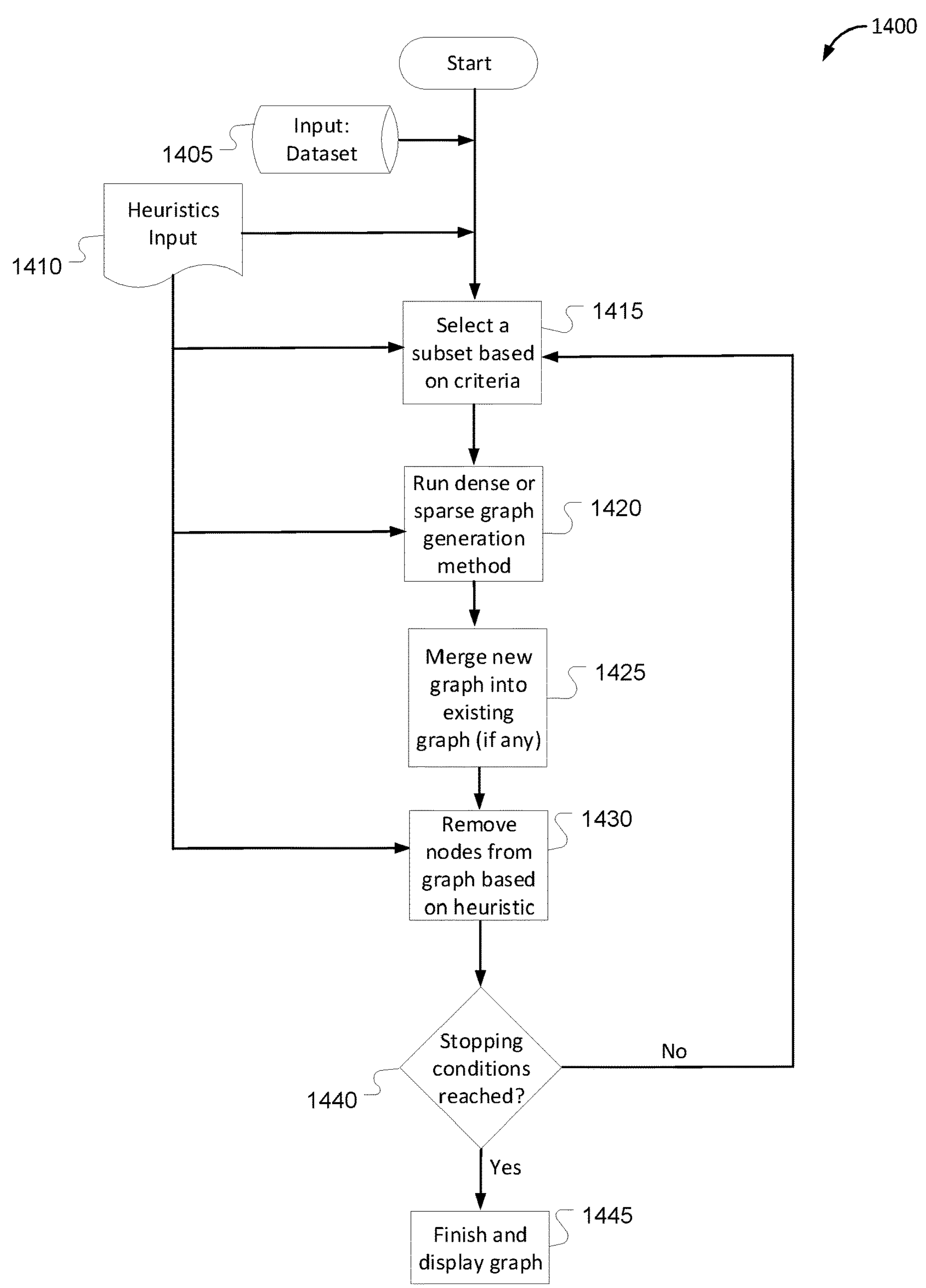
FIG. 14 illustrates a process flow according to an alternate embodiment of the disclosure.

FIG. 14 illustrates a system level process flow 1400 that depicts various aspects of the embodiments described and claimed herein. In some cases, process flow 1400 may implement one or more aspects of systems 100 and/or 400 as described in relation to FIGS. 1 and 4, respectively, and other figures described herein. Further, process flow 1400 may be directed to an enrichment process for optimizing DAG generation in accordance with one or more implementations. As shown, process flow 1400 may utilize input dataset 1405. Process flow 1400 may optionally include heuristics input 1410, which may be used for decision making. Input dataset 1405 and heuristics input 1410 may be examples of the input datasets 1205 and 1305, and heuristics inputs 1210 and 1310, respectively, as described above in relation to FIGS. 12 and 13. As previously described, heuristics input 1410 may include one or more of KPIs, user behavior information, and hyperparameters, to name a few non-limiting examples At 1415, the system may select a subset for optimizing. For instance, the system may choose a subset to focus on based on some criteria (e.g., single-criteria (average price), multiple criteria (average price and average spend)). In some other cases, the system may select the whole input dataset at 1415.

At 1420, the system may run one of a dense (i.e., described in FIG. 13) or a sparse DAG generation method (i.e., described in FIG. 12) on the selected subset, or alternatively, on the whole input dataset.

At 1425, the system may merge a new graph (e.g., a DAG) or a sub portion of the graph into an existing DAG, if any. For instance, in some cases, the system may generate a new DAG from the process in 1420, which may be merged with one or more existing DAGs stored in memory.

At 1430, the system may remove one or more nodes from the DAG (e.g., new DAG, merged DAG, etc.) based on a heuristic. One example of a heuristic may include a size of a subset. In such cases, the system may determine if one or more nodes need to be removed from the DAG, for instance, if the subset size is too small (i.e., under a threshold, where the threshold may be based upon the sizes needed for statistical significance, or where the statistical attributes of the group suggest that it does not merit further attention).

At 1440, the system may check if stopping conditions have been reached. Stopping conditions may include the total number of nodes in the DAG, the total number of times each record in the dataset appears within the DAG, a node or nodes in the DAG exceeding a threshold on their statistics. In some examples, the statistics may be based on the consistency of a given metric within the group.

If no, the system may select another subset defined by one or more criteria at 1415 and repeat the steps of 1420-1430. Once stopping conditions have been reached at 1440, the system may proceed to 1445, where it may finish generating and displaying the DAG to the user. In some embodiments, the DAG may be displayed to the user via a user interface on a user device, such as a laptop, a computer, a mobile device (e.g., cell phone, tablet, Netbook), etc. It should be noted that, in some embodiments, only a sub portion of the DAG may be displayed to the user.

Figure 15:
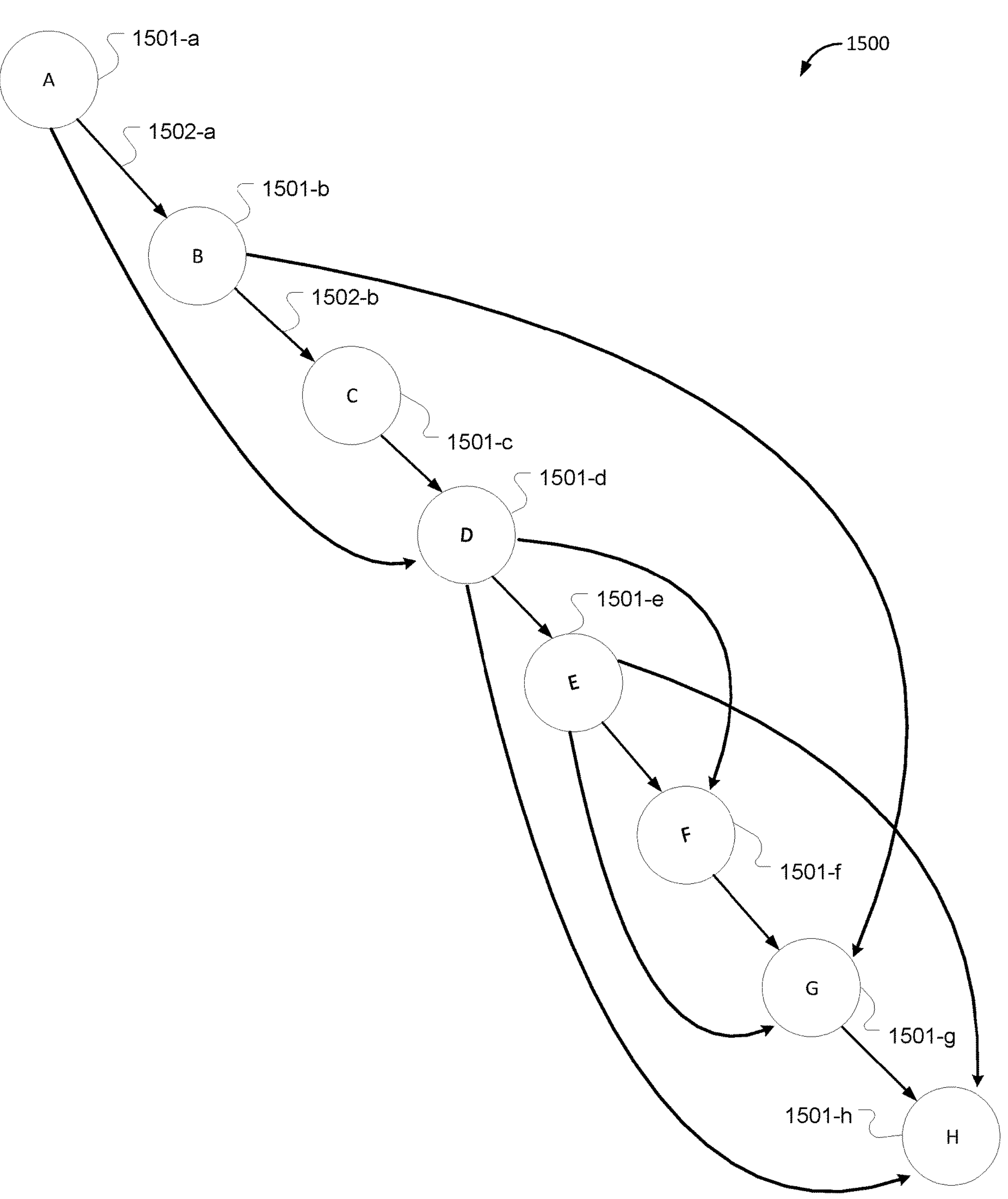
FIG. 15 illustrates an example of a Directed Acyclic Graph (DAG) according to an embodiment of the disclosure.

FIG. 15 illustrates an example of a Directed Acyclic Graph (DAG) 1500 according to an embodiment of the disclosure. In some cases, DAGs may be examples of causal path diagrams, and may consist of nodes representing variables. According to the present disclosure, a subset defined by one or more filters may be an example of a variable. Further, a DAG may be utilized to calculate and display the parent sets (and other ancestors), as well as descendants (or children subsets) of a subset. As shown, nodes 1501 (e.g., nodes 1501-*a*, 1501-*b*, 1501-*c*, 1501-*d*, 1501-*c*, 1501-*f*, 1501-*g*, 1501-*h*) may represent a variable. Further, arrows 1502 (e.g., arrows 1502-*a*, 1502-*b*, etc.) may be used to depict direct causal effects by connecting nodes with each other.

In some circumstances, DAGs may be read like an ancestry tree and kinship terminology may be used to describe relationships between the nodes or variables in a DAG. Accordingly, in the example shown in FIG. 15, 'A' seen in node 1501-*a* may be a parent of 'B' in node 1501-*b* and 'D' in node 1501-*d*. Further, 'B' in node 1501-*b* is a child of 'A' in node 1501-*a*. In another example, 'B' may be a parent of 'C' in node 1501-*c* and 'G' in node 1501-*g*. Further, 'E' in node 1501-*e* is a parent of 'F' in node 1501-*f*, 'G' in node 1501-*g*, and 'H' in 1501-*h*. In some embodiments, a node may have no parents or children. For instance, 'A' in node 1501-*a* and 'H' in 1501-*h* have no parent and child, respectively. In some cases, no variable or node may be an ancestor of itself in a DAG, since DAGs are finite directed graphs with no directed cycles.

Figure 16:
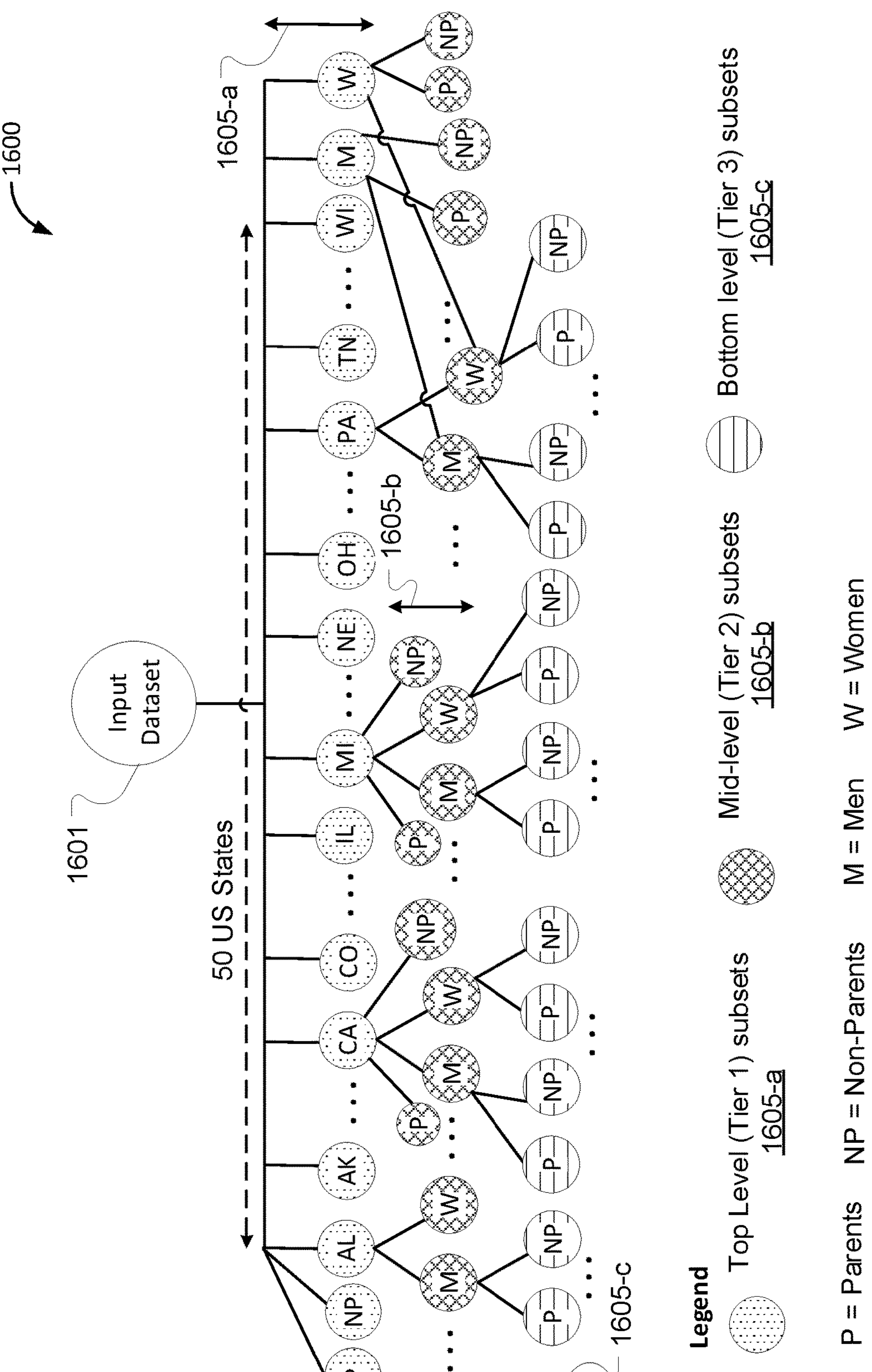
FIG. 16 illustrates an example visualization of a decision tree in accordance with one or more implementations.

FIG. 16 illustrates an example visualization of a decision tree 1600 in accordance with one or more implementations. In some embodiments, aspects of the present disclosure may relate to the decomposition of data into a DAG. In some cases, an input dataset 1601, also referred to as a root, may be divided across many different dimensions. It should be noted that, the input dataset 1601 may itself be a subset of a larger data set. In this example, input dataset 1601 may relate to a dataset of people. Further, input dataset 1601 may be divided into 52 top-level or tier 1 subsets 1605-*a*, where a subset may be generated for residents of each US state (i.e., 50 subsets), and a subset each for men and women (i.e., 2 subsets). Data of the input dataset 1601 may be further sub-divided into 100 mid-level or tier 2 subsets 1605-*b* with a subset for each gender for each state. For instance, as shown, the node 'CA' (i.e., for California) of the top-level subsets 1605-*a* comprises a child node ('M' for Men) and another child node ('W' for Women). Thus, the 100 mid-level subsets 1605-*b* associated with different gender values for different states each comprise 2 parents, the state and the gender alone. In other words, a subset defined by filters [CA, Men] comprises two parent sets, where a first parent set may be defined by filter [CA], and the second parent set may be defined by filter [Men].

In some embodiments, a third dimension may be added. In this example, the third dimension relates to if a person is a parent (e.g., father or mother) or a non-parent. Upon adding the third dimension, two more top level subsets 1605-*a* may be added, represented as 'P' for Parent and 'NP' for Non-Parent in the figure. Further, another tier below the 100 mid-level subsets 1605-*b* may be added with a total of 200 bottom level or tier 3 subsets 1605-*c*, where parent and non-parent nodes may be added under the men and women nodes for each state. Additionally or alternatively, 104 more mid-level subsets 1605-*b* may be added, a subset each for parents and non-parents for each of the 50 states (i.e., 100 subsets), and a subset each for parents and non-parents for men and women (i.e., 4 subsets). Aspects of the present disclosure may relate to decomposing data in the decision tree 1600 into a DAG, further described below. In some cases, the DAG generated from decomposing data in the decision tree 1600 may be provided to a user via an interactive user interface on a visual display.

Figure 17A:
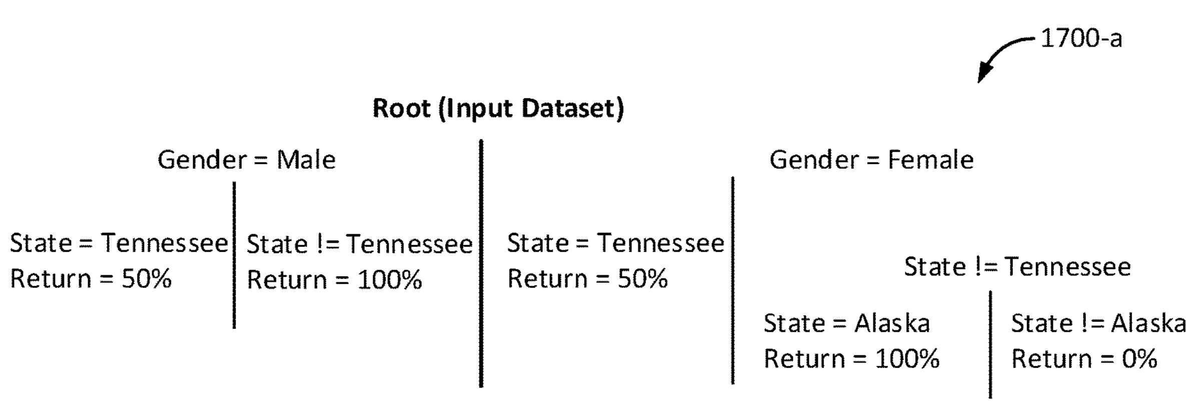
FIGS. 17A and 17B illustrate example visualizations of decision trees in accordance with one or more implementations.
Figure 17B:
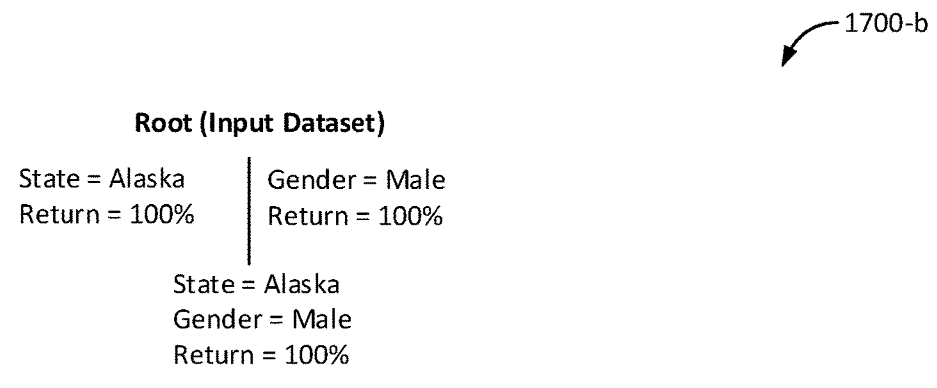

FIGS. 17A and 17B illustrate example visualizations of decision trees 1700-*a* and 1700-*b*, respectively, in accordance with one or more implementations. In some cases, decision trees 1700-*a* and 1700-*b* may implement one or more aspects of the figures described herein. Further, decision trees 1700-*a* and 1700-*b* may be based in part on the input dataset 1601 discussed above in FIG. 16. In some aspects, the example discussed in FIG. 17A may relate to the behavior of an input dataset (i.e., a root).

In this example, imagine if everyone in Alaska returns 100% of the items they buy, as do Men in the majority of states. Further, women in most states other than Alaska do not return at all. In Tennessee, however, both men and women return at a 50% rate. Based on the above information, decision tree 1700-*a* may be represented as shown in FIG. 17A.

In this example, if a user is analyzing a resident of Alaska, and attempting to anticipate if they will return a purchased item (i.e., solely on the basis of the decision tree 1700-*a*), they may or may not be able to anticipate if the Alaskan resident will return the item they purchased regardless of their gender. If the user does anticipate that the item will be returned, there may be some ambiguity regarding why. For instance, due to the structure of the decision tree 1700-*a* illustrated in FIG. 17A, it may not be obvious to the user that all residents of Alaska return their purchased items regardless of gender.

Turning now to FIG. 17B, which illustrates an alternate way of depicting the example from FIG. 17A. FIG. 17B relates to the decomposition of data in decision tree 1700-*a* into decision tree 1700-*b*. It should be noted that, decision tree 1700-*b* may be represented as a DAG, in some embodiments. In this case, the ambiguity of the cause of return rate may be clear to a user analyzing an Alaska resident. In some cases, aspects of the present disclosure may relate to decomposing data in decision tree 1700-*a* into a simplified decision tree 1700-*b*, or a DAG, which may assist users in making business decisions.

Figure 18:
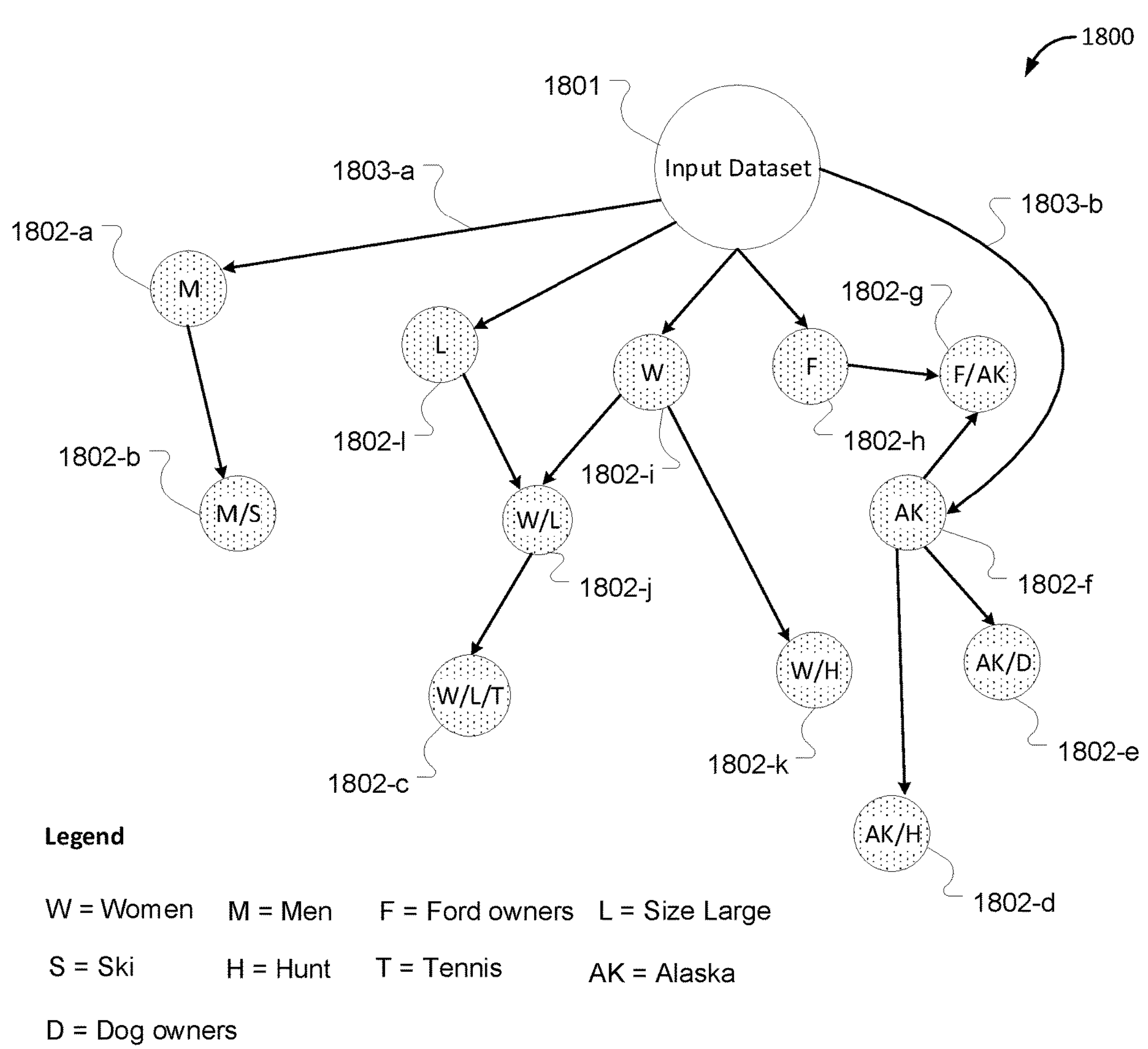
FIG. 18 illustrates an example of a DAG according to an embodiment of the disclosure.

FIG. 18 illustrates an example of a DAG 1800 according to an embodiment of the disclosure. In some cases, DAGs may be examples of causal path diagrams, and may consist of nodes representing variables. According to the present disclosure, a subset defined by one or more filters may be an example of a variable. Further, a DAG may be utilized to calculate and display the parent sets (and other ancestors), as well as descendants (or children subsets) of a subset. In some cases, an input data set 1801 may be divided across many different dimensions. In the example shown in FIG. 18, a criteria for analyzing the input data set 1801, such as heuristics around sales numbers, may be identified. As shown, nodes 1802 (e.g., nodes 1802-*a*, 1802-*b*, 1802-*c*, 1802-*d*, 1802-*c*, 1802-*f*, 1802-*g*, 1802-*h*, 1802-*i*, 1802-*j*, 1802-*k*, and 1802-1) may represent subsets defined by a set of filters. Further, arrows 1803 (e.g., arrows 1803-*a*, 1803-*b*, etc.) may be used to depict additional subset/superset or parent/child relationships.

It should be noted that, FIG. 18 utilizes a parent/child notation for ease of representation. For instance, W/L in node 1802-*j* indicates a subset defined by the filters (Women who buy size Large), where the subset is a child of a subset defined by the filters (People who buy size Large), shown by node 1802-1, as well as the subset defined by the filter (Women), shown by node 1802-*i*. Similarly, W/L/T in node 1802-*c* indicates that the subset is defined by the filters (Women who buy size Large and play Tennis). Further, the subset defined by the filters (Women who buy size Large and play Tennis) may be a child of: a subset defined by the filters (People who buy size Large) shown by node 1802-1, a subset defined by the filters (Women who buy size Large) shown by node 1802-*j*, a subset defined by the filters (People who play Tennis) (not shown), and a subset defined by the filters (Women who play Tennis) (not shown).

According to aspects of the present disclosure, decomposing data may begin by starting with the data universe (i.e., input dataset 1801). Further, an interesting subset defined using a filter (Women) may be identified, shown by node 1802-*i*. For instance, the subset defined by the filter (Women) may be classified as an interesting subset because the average spend value of that subset is high (i.e., the heuristic). Further, another interesting subset (i.e., comprising notable characteristics) may be identified, such as a subset defined by the filter (Ford owners), shown by node 1802-*h*. In some embodiments, one or more children sets of the subsets shown by nodes 1802-*i* and 1802-*h* may be identified. As an example, the subsets defined by filters (Ford owners in Alaska), shown by node 1802-*g*, and filters (Women who buy size Large), shown by node 1802-*j*, may be identified. After identifying the children sets, the process may involve identifying parent subsets of those children subsets. For instance, a subset defined using filters (People who buy size Large), shown by node 1802-1, and a subset defined using filters (People in Alaska), shown by node 1802-*f*, may be identified. In some embodiments, decomposing data into a DAG may comprise iterating through the steps above to find interesting children sets (e.g., People in Alaska who hunt, shown by node 1802-*d*, or People in Alaska with dogs, shown by node 1802-*c*) of the parent set (e.g., People in Alaska, shown by node 1802-*f*). Further, the parent sets of the identified interesting children sets may be identified, such as a subset defined by filters (People with dogs) or a subset defined by filters (People who hunt) (not shown), and the process repeated iteratively until a termination or stopping condition is reached.

As seen, after identifying the subset defined by filters (Women who buy size Large) shown by node 1802-*j*, a child subset defined by filters (Women who buy size Large and play Tennis) shown by node 1802-*c* may be identified. The child subset shown by node 1802-*c* may comprise parent sets defined using filters (People who play Tennis) or filters (Women who play Tennis), not shown. Alternatively, after identifying the subset defined by filters (People who hunt), a child subset defined using filters (Women who hunt), shown by node 1802-*k*, may be identified based on one or more heuristics, such as an average sales number.

Additionally or alternatively, an interesting subset defined using a filter (Men) shown by node 1802-*a* may be identified. Furthermore, a child subset defined using filters (Men who ski), shown by node 1802-*b*, may also be identified. In this example, however, no additional interesting parent sets or children sets of the subset defined using the filter (Men) or the subset defined using the filters (Men who ski) may be identified, for instance, based on the criteria or heuristics identified for analyzing the input data set 1801.

While this is a simplified example, and solely presented for the purposes of discussion, similar techniques may be implemented while analyzing and decomposing substantially larger decision trees, for instance, comprising trillions of nodes in the DAG together with multiple interactions in subtle percentages. In some cases, aspects of the present disclosure may relate to displaying the DAG 1800 or a sub portion of the DAG 1800 to one or more users via a visual interface.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for decomposing data, the system comprising:

one or more hardware processors configured by machine-readable instructions to:

receive an input data set, the input data set including information to be analyzed;

analyze the input data set to determine a first data subset having a divergent pattern, wherein the first data subset is defined by a first set of filters;

determine, in a first iteration, one or more first children subsets having the divergent pattern, wherein the one or more first children subsets are each defined by one or more additional filters to the first set of filters;

determine, in the first iteration, one or more first parent subsets having the divergent pattern, wherein the one or more first parent subsets are each defined by at least one fewer filter than the one or more first children subsets, and wherein the one or more first parent subsets are different than the first data subset;

determine, in one or more subsequent iterations until a stopping condition is reached, one or more additional children subsets having the divergent pattern, wherein each of the one or more additional children subsets are defined by at least one additional filter to that of previously determined parent subsets;

determine, in the one or more subsequent iterations until the stopping condition is reached, one or more additional parent subsets having the divergent pattern, wherein the one or more additional parent subsets are defined by at least one fewer filter than previously determined children subsets;

identify notable subsets within the input data set using one or more heuristic inputs comprising at least one key performance indicator;

process the identified notable subsets using one or more machine learning techniques to identify subsets or patterns based at least in part on the one or more heuristic inputs; and recursively repeat identifying and evaluating subsets using the one or more machine learning techniques based on relationships with multiple parent subsets to refine identification of one or more additional notable subsets within the input data set until the stopping condition is reached.

2. The system of claim 1, wherein the system applies statistical analysis, one or more machine learning techniques, or other data analysis techniques to detect correlations within the input data set.

3. The system of claim 1, wherein the system is further configured to display, via an interactive user interface, the identified notable subsets.

4. The system of claim 3, wherein the interactive user interface is configured to accept a user input action based on user interaction with at least one data subset of the notable subsets.

5. The system of claim 1, wherein the system is further configured to aggregate heuristic-based metrics, including key performance indicators, associated with the identified notable subsets across multiple iterations.

6. The system of claim 1, wherein the system is further configured to receive a set of criteria types along with the input data set to define filters and heuristic inputs used to identify notable subsets.

7. A method of decomposing data, comprising:

receiving an input data set, the input data set including information to be analyzed;

analyzing the input data set to determine a first data subset having a divergent pattern, wherein the first data subset is defined by a first set of filters;

determining, in a first iteration, one or more first children subsets having the divergent pattern, wherein the one or more first children subsets are each defined by one or more additional filters to the first set of filters;

determining, in the first iteration, one or more first parent subsets having the divergent pattern, wherein the one or more first parent subsets are each defined by at least one fewer filter than the one or more first children subsets, and wherein the one or more first parent subsets are different than the first data subset;

determining, in one or more subsequent iterations until a stopping condition is reached, one or more additional children subsets having the divergent pattern, wherein each of the one or more additional children subsets are defined by at least one additional filter to that of previously determined parent subsets;

determining, in the one or more subsequent iterations until the stopping condition is reached, one or more additional parent subsets having the divergent pattern, wherein the one or more additional parent subsets are defined by at least one fewer filter than previously determined children subsets;

identifying notable subsets within the input data set using one or more heuristic inputs comprising at least one key performance indicator;

processing the identified notable subsets using one or more machine learning techniques to identify subsets or patterns based at least in part on the one or more heuristic inputs; and recursively repeating identifying and evaluating subsets using the one or more machine learning techniques based on relationships with multiple parent subsets to refine identification of additional notable subsets within the input data set until the stopping condition is reached.

8. The method of claim 7, wherein identifying at least one data pattern includes applying statistical analysis, machine learning models, or other data analysis techniques to detect correlations within the input data set.

9. The method of claim 7, wherein the one or more machine learning techniques are trained using heuristic inputs comprising historical user interactions and previously identified data patterns.

10. The method of claim 7, further comprising sorting the notable subsets based on one or more heuristic-based scores or statistics associated with the notable subsets.

11. The method of claim 10, further comprising displaying, via a user interface, the sorted notable subsets.

12. The method of claim 11, further comprising determining user interactions with the displayed notable subsets to refine future pattern identification.

13. The method of claim 7, further comprising:

identifying at least one second data pattern within the input data set after recursively applying one or more machine learning techniques to the input data set;

identifying one or more second notable subsets using an additional heuristic input comprising a key performance indicator;

processing the identified one or more second notable subsets using the one or more machine learning techniques; and recursively repeating the identifying and processing steps to the input data set until a stopping condition is reached.

14. The method of claim 13, further comprising dynamically aggregating heuristic-based metrics associated with notable subsets across interrelated tables to refine data pattern analysis.

15. The method of claim 7, further comprising removing at least one data subset from the input data set upon determining that the at least one data subset does not contain at least one data pattern.

* * * * *